US008189271B2

(12) United States Patent
Yamakawa

(10) Patent No.: US 8,189,271 B2
(45) Date of Patent: May 29, 2012

(54) IMAGING LENS AND IMAGING APPARATUS

(75) Inventor: Hiromitsu Yamakawa, Saitama (JP)

(73) Assignee: Fujifilm Corporation, Tokyo (JP)

( * ) Notice: Subject to any disclaimer, the term of this patent is extended or adjusted under 35 U.S.C. 154(b) by 0 days.

(21) Appl. No.: 13/094,414

(22) Filed: Apr. 26, 2011

(65) Prior Publication Data
US 2011/0261472 A1  Oct. 27, 2011

(30) Foreign Application Priority Data

Apr. 26, 2010 (JP) ................................. 2010-100613

(51) Int. Cl.
*G02B 3/02* (2006.01)
*G02B 9/34* (2006.01)
(52) U.S. Cl. .......................... 359/715; 359/740; 359/781
(58) Field of Classification Search .................. 359/715, 359/740, 781
See application file for complete search history.

(56) References Cited

U.S. PATENT DOCUMENTS

| 7,280,289 | B2 | 10/2007 | Yamakawa | |
|---|---|---|---|---|
| 7,405,890 | B2 | 7/2008 | Nakamura | |
| 7,518,809 | B2 * | 4/2009 | Yamakawa et al. | ........... 359/753 |
| 7,551,373 | B2 | 6/2009 | Hirose | |
| 7,697,221 | B2 | 4/2010 | Mori | |
| 2011/0164328 | A1 * | 7/2011 | Yamakawa | ................... 359/715 |
| 2011/0188132 | A1 * | 8/2011 | Yamakawa | ................... 359/715 |
| 2011/0188133 | A1 * | 8/2011 | Yamakawa | ................... 359/715 |

FOREIGN PATENT DOCUMENTS

JP  2008-268268  11/2008

* cited by examiner

*Primary Examiner* — Evelyn A. Lester
(74) *Attorney, Agent, or Firm* — Young & Thompson

(57) ABSTRACT

An imaging lens includes a first-lens having negative power, and which is a meniscus lens the image-side surface of which has concave shape; a second-lens, the object-side surface and the image-side surface of which are aspheric, and which has double-concave shape in the vicinity of an optical axis; a third-lens, the object-side surface and the image-side surface of which are aspheric, and which has double-convex shape in the vicinity of the optical axis; a stop; and a fourth-lens, the object-side surface and the image-side surface of which are aspheric, and which has double-convex shape in the vicinity of the optical axis, which are arranged from the object side in the order mentioned above. Further, formula (1) is satisfied:

$0.0 < r5/r4 < 1.0$   (1), where r4: a paraxial radius of curvature of the image-side surface of the second-lens, and
r5: a paraxial radius of curvature of the object-side surface of the third-lens.

9 Claims, 13 Drawing Sheets

EXAMPLE 1

EXAMPLE 1

EXAMPLE 3

EXAMPLE 4

EXAMPLE 5

EXAMPLE 6

EXAMPLE 1
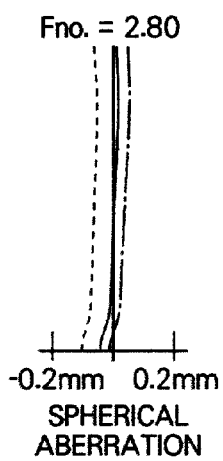
FIG. 7A
SPHERICAL ABERRATION
Fno. = 2.80
−0.2mm  0.2mm
—— e-LINE
----- g-LINE
—·— C-LINE
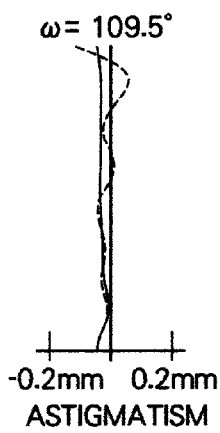
FIG. 7B
ASTIGMATISM
ω = 109.5°
−0.2mm  0.2mm
—— SAGITTAL
----- TANGENTIAL
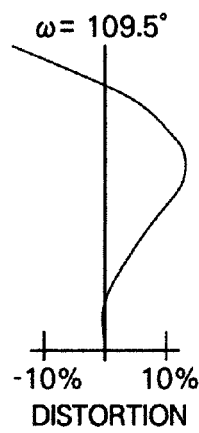
FIG. 7C
DISTORTION
ω = 109.5°
−10%  10%
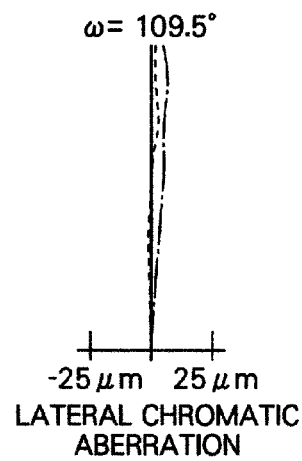
FIG. 7D
LATERAL CHROMATIC ABERRATION
ω = 109.5°
−25 μm  25 μm
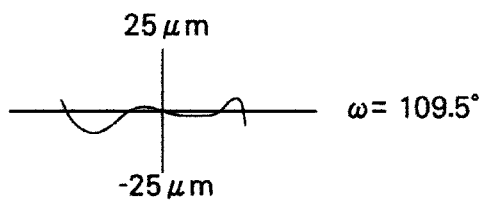
ω = 109.5°   FIG. 7E
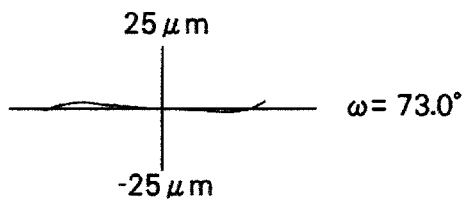
ω = 73.0°   FIG. 7F
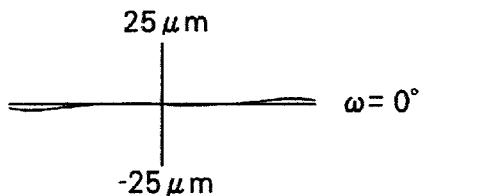
ω = 0°   FIG. 7G

EXAMPLE 2
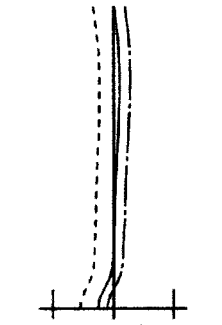
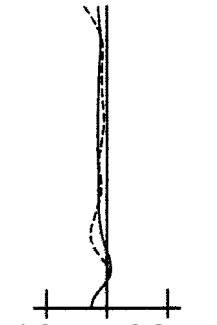
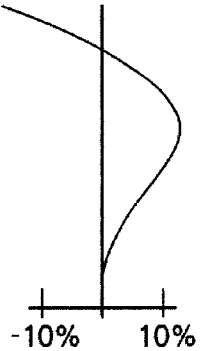
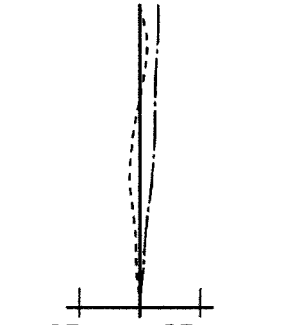
FIG. 8A  SPHERICAL ABERRATION (Fno. = 2.80)
FIG. 8B  ASTIGMATISM ($\omega$ = 109.9°)
FIG. 8C  DISTORTION ($\omega$ = 109.9°)
FIG. 8D  LATERAL CHROMATIC ABERRATION ($\omega$ = 109.9°)
—— e-LINE
----- g-LINE
—·— C-LINE
—— SAGITTAL
----- TANGENTIAL
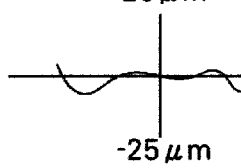
FIG. 8E  $\omega$ = 109.9°
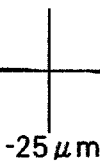
FIG. 8F  $\omega$ = 72.9°
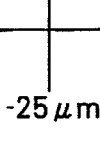
FIG. 8G  $\omega$ = 0°

EXAMPLE 3
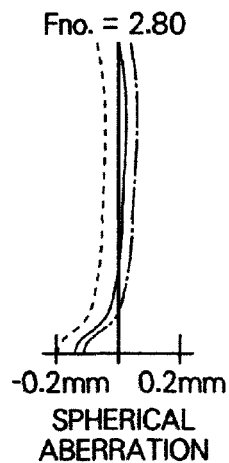
Fno. = 2.80
-0.2mm  0.2mm
SPHERICAL ABERRATION
FIG. 9A
—— e-LINE
----- g-LINE
—·— C-LINE
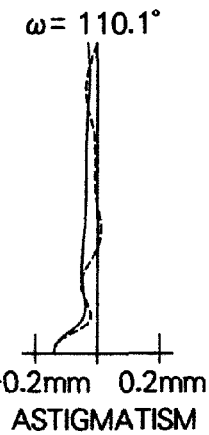
ω = 110.1°
-0.2mm  0.2mm
ASTIGMATISM
FIG. 9B
—— SAGITTAL
----- TANGENTIAL
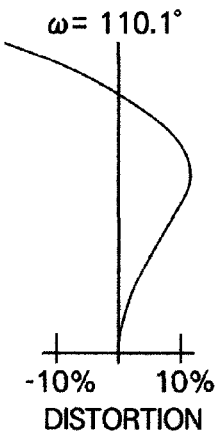
ω = 110.1°
-10%  10%
DISTORTION
FIG. 9C
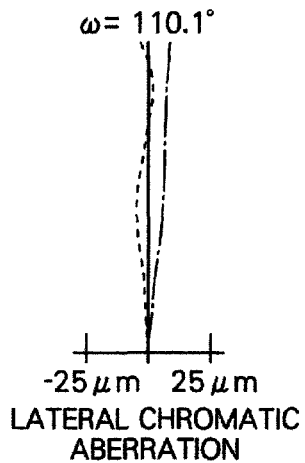
ω = 110.1°
-25μm  25μm
LATERAL CHROMATIC ABERRATION
FIG. 9D
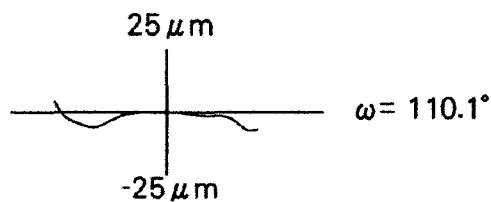
ω = 110.1°   FIG. 9E
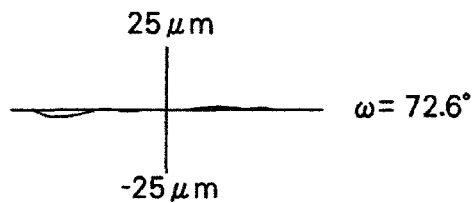
ω = 72.6°   FIG. 9F
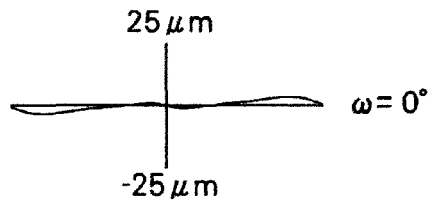
ω = 0°   FIG. 9G

EXAMPLE 4
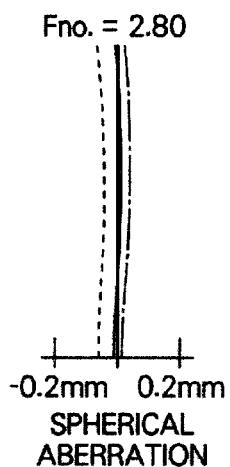
Fno. = 2.80
-0.2mm 0.2mm
SPHERICAL ABERRATION
FIG. 10A
—— e-LINE
----- g-LINE
—-— C-LINE
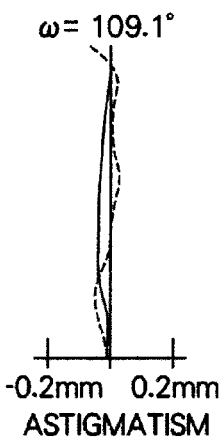
ω= 109.1°
-0.2mm 0.2mm
ASTIGMATISM
FIG. 10B
—— SAGITTAL
----- TANGENTIAL
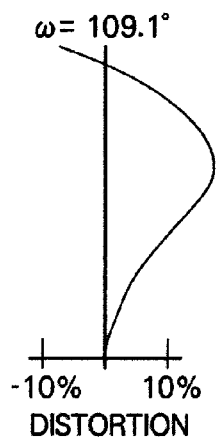
ω= 109.1°
-10% 10%
DISTORTION
FIG. 10C
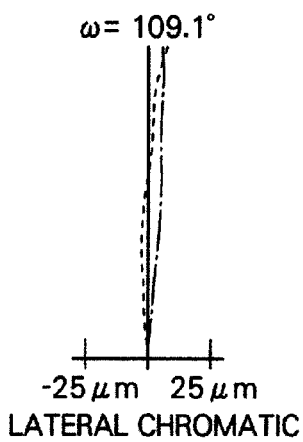
ω= 109.1°
-25μm 25μm
LATERAL CHROMATIC ABERRATION
FIG. 10D
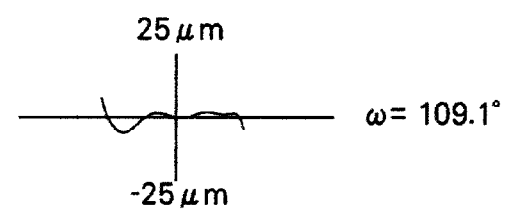
ω= 109.1°   FIG. 10E
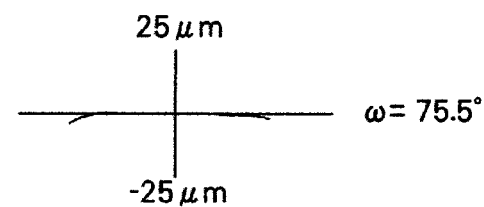
ω= 75.5°   FIG. 10F
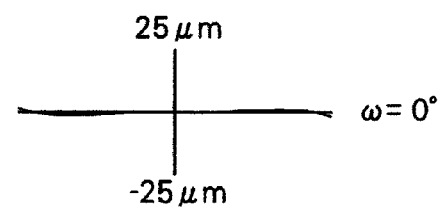
ω= 0°   FIG. 10G

EXAMPLE 5
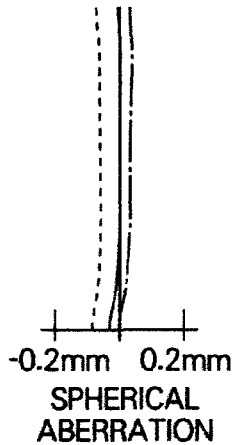
SPHERICAL
ABERRATION
FIG. 11A
—— e-LINE
----- g-LINE
—·— C-LINE
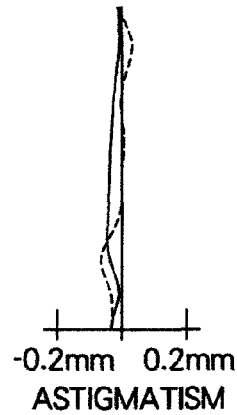
ASTIGMATISM
FIG. 11B
—— SAGITTAL
----- TANGENTIAL
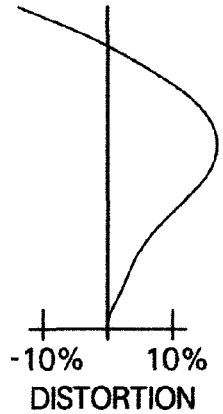
DISTORTION
FIG. 11C
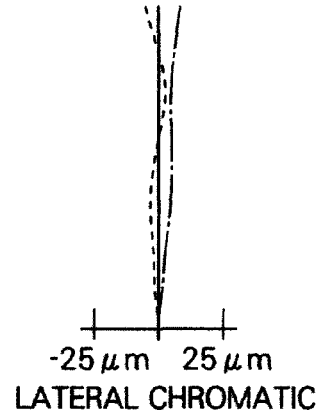
LATERAL CHROMATIC
ABERRATION
FIG. 11D
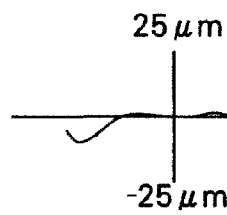
ω = 108.8°  FIG. 11E
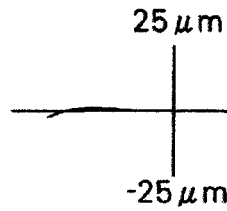
ω = 71.6°  FIG. 11F
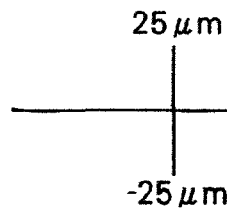
ω = 0°  FIG. 11G

EXAMPLE 6
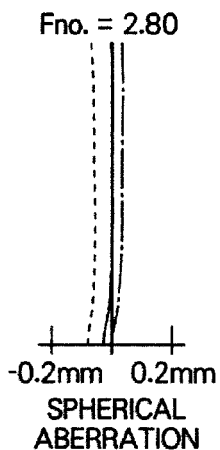
SPHERICAL ABERRATION
FIG. 12A
— e-LINE
----- g-LINE
—·— C-LINE
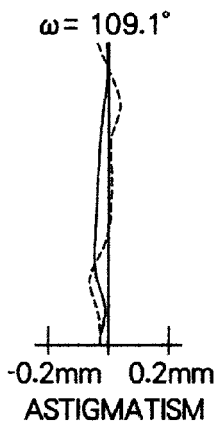
ASTIGMATISM
FIG. 12B
— SAGITTAL
----- TANGENTIAL
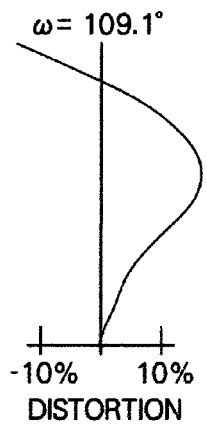
DISTORTION
FIG. 12C
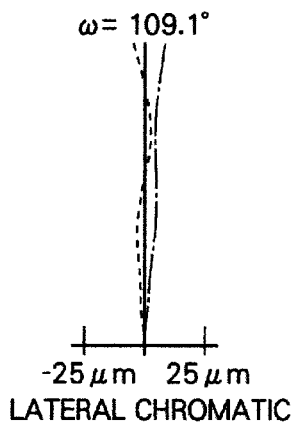
LATERAL CHROMATIC ABERRATION
FIG. 12D
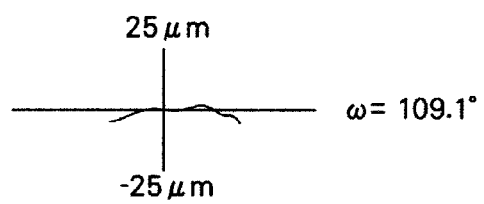
$\omega = 109.1°$ FIG. 12E
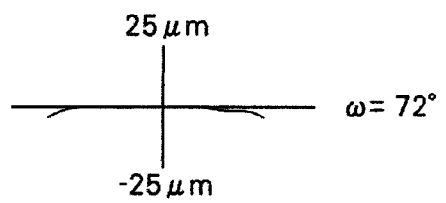
$\omega = 72°$ FIG. 12F
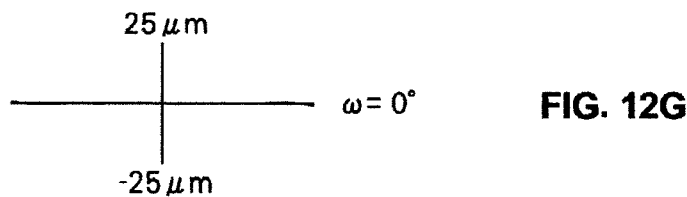
$\omega = 0°$ FIG. 12G

IMAGING LENS AND IMAGING APPARATUS

BACKGROUND OF THE INVENTION

1. Field of the Invention

The present invention relates to an imaging lens and an imaging apparatus. In particular, the present invention relates to a wide-angle imaging lens that is appropriate for use in an in-vehicle camera, a monitor camera, or the like that uses an imaging device, such as a CCD (Charge Coupled Device) and a CMOS (Complementary Metal Oxide Semiconductor). Further, the present invention relates to an imaging apparatus including the imaging lens.

2. Description of the Related Art

In recent years, the size of an imaging device such as a CCD and a CMOS became very small, and the resolution of the imaging device became very high. Therefore, the size and the weight of the main body of imaging equipment and an imaging lens mounted on the imaging equipment also need to be reduced. Meanwhile, imaging lenses used in in-vehicle cameras (on-vehicle cameras), monitor cameras (or surveillance or security cameras) and the like need to have excellent weather-resistance characteristics. Further, the imaging lenses need to have wide angles of view and excellent optical performance so that an excellent view is ensured for a wide imaging range.

Further, since it is desirable to reduce the cost for producing the imaging lens in the aforementioned fields, an optical system composed of a small number of lenses is desirable. Conventionally, for example, U.S. Pat. No. 7,280,289 (Patent Document 1), U.S. Pat. No. 7,551,373 (Patent Document 2), U.S. Pat. No. 7,405,890 (Patent Document 3), Japanese Unexamined Patent Publication No. 2008-268268 (Patent Document 4), and U.S. Pat. No. 7,697,221 (Patent Document 5) disclose imaging lenses, each composed of four lenses, in the aforementioned fields.

In the fields of in-vehicle cameras, monitor cameras, and the like, a demand for wider angle lenses increased in recent years. For example, a demand for lenses with full angles of view exceeding 200° increased. However, the full angles of view of lenses disclosed in Patent Document 1 are in the range of approximately 140° to 165°. The full angles of view of lenses disclosed in Patent Document 2 are 161° and 164°. The full angle of view of a lens disclosed in Patent Document 3 is 134°, and the full angles of view of lenses disclosed in Patent Document 4 are 150° and 159°. Further, the full angles of view of lenses disclosed in Patent Document 5 are in the range of approximately 140° to 146°. Therefore, they do not satisfy the demand for a wider lens with a full angle of view exceeding 200°.

Further, as the size of the imaging device became smaller, and the resolution of the imaging device became higher in recent years, there is a demand for an imaging lens that has high resolution and high optical performance that can make it possible to obtain excellent images for a wide image formation range. However, in the conventional lens system, it was difficult to satisfy such a demand, while structuring the lens system at low cost and in small size.

SUMMARY OF THE INVENTION

In view of the foregoing circumstances, it is an object of the present invention to provide a small imaging lens that can be produced at low cost, but which can realize an even wider angle of view and higher optical performance. Further, it is another object of the present invention to provide an imaging apparatus including the imaging lens.

An imaging lens of the present invention is an imaging lens comprising:

a first lens having negative power, and which is a meniscus lens the image-side surface of which has concave shape;

a second lens, the object-side surface and the image-side surface of which are aspheric, and which has double concave shape in the vicinity of an optical axis;

a third lens, the object-side surface and the image-side surface of which are aspheric, and which has double convex shape in the vicinity of the optical axis;

a stop; and a fourth lens, the object-side surface and the image-side surface of which are aspheric, and which has double convex shape in the vicinity of the optical axis, and the first lens, the second lens, the third lens, the stop and the fourth lens being arranged from the object side of the imaging lens in the order mentioned above, wherein the following formula (1) is satisfied:

$$0.0 < r5/r4 < 1.0 \qquad (1),\text{ where}$$

r4 is a paraxial radius of curvature of the image-side surface of the second lens, and r5 is a paraxial radius of curvature of the object-side surface of the third lens.

The expression "having negative power, and which is a meniscus lens the image-side surface of which has concave shape" related to the first lens in the imaging lens of the present invention is about a paraxial region of the first lens when the first lens is an aspheric lens.

It is desirable that the imaging lens of the present invention satisfies the following formulas (2) through (6):

$$0.0 < f/r4 < 0.2 \qquad (2),$$

$$-12.0 < f1/f < -9.0 \qquad (3),$$

$$4.0 < L/f34 < 6.0 \qquad (4),$$

$$5.0 < L/f4 < 8.0 \qquad (5),\text{ and}$$

$$0.5 < (r4+r3)/(r4-r3) < 1.0 \qquad (6),\text{ where}$$

f is a focal length of the entire system of the imaging lens, f1 is a focal length of the first lens, f4 is a focal length of the fourth lens, f34 is a combined focal length of the third lens and the fourth lens, r3 is a paraxial radius of curvature of the object-side surface of the second lens, r4 is a paraxial radius of curvature of the image-side surface of the second lens, and L is a distance from the vertex of the object-side surface of the first lens to an image plane (a back focal distance is an in-air-equivalent length).

In preferred embodiments of the present invention, any one of the formulas (2) through (6) may be satisfied. Alternatively, at least two arbitrary formulas of the formulas (2) through (6) in combination may be satisfied.

In the formulas (1), (2), and (6), the sign of the paraxial radius of curvature is positive when the surface is convex toward the object side, and negative when the surface is convex toward the image side.

In the imaging lens of the present invention, it is desirable that the Abbe number of the material of the first lens with respect to d-line is greater than or equal to 40. Further, it is desirable that the Abbe number of the material of the second lens with respect to d-line is greater than or equal to 50. Further, it is desirable that the Abbe number of the material of the third lens with respect to d-line is less than or equal to 40.

Further, it is desirable that the Abbe number of the material of the fourth lens with respect to d-line is greater than or equal to 50.

It is desirable that the full angle of view of the imaging lens of the present invention is greater than or equal to 200°.

An imaging apparatus according to the present invention is an imaging apparatus including an imaging lens of the present invention.

In the imaging lens of the present invention, the power, the shape and the like of each lens are appropriately set in the four-lens optical system, which is composed of four lenses, and a predetermined formula or formulas are satisfied. Therefore, it is possible to realize an even wider angle of view and higher optical performance, while structuring the imaging lens at low cost and in small size.

The imaging apparatus of the present invention includes the imaging lens of the present invention. Therefore, it is possible to structure the imaging apparatus at low cost and in small size. Further, the imaging apparatus of the present invention can perform imaging with a wide angle of view, and obtain high-quality images or video images.

BRIEF DESCRIPTION OF THE DRAWINGS

FIGS. 7A through 7G are diagrams illustrating aberrations of the imaging lens in Example 1 of the present invention;

FIGS. 8A through 8G are diagrams illustrating aberrations of the imaging lens in Example 2 of the present invention;

FIGS. 9A through 9G are diagrams illustrating aberrations of the imaging lens in Example 3 of the present invention;

FIGS. 10A through 10G are diagrams illustrating aberrations of the imaging lens in Example 4 of the present invention;

FIGS. 11A through 11G are diagrams illustrating aberrations of the imaging lens in Example 5 of the present invention;

FIGS. 12A through 12G are diagrams illustrating aberrations of the imaging lens in Example 6 of the present invention.

DESCRIPTION OF THE PREFERRED EMBODIMENTS

Hereinafter, embodiments of the present invention will be described in detail with reference to drawings. FIGS. 1 through 6 are cross sections of imaging lenses according to embodiments of the present invention. FIGS. 1 through 6 correspond to imaging lenses of Examples 1 through 6, respectively, which will be described later. The examples illustrated in FIGS. 1 through 6 have basically similar structure, and FIGS. 1 through 6 are illustrated in a similar manner. Therefore, an imaging lens according to an embodiment of the present invention will be described mainly with reference to FIG. 1.

The imaging lens according to the present embodiment is a lens system composed of four lenses, namely, first lens L1, second lens L2, third lens L3 and fourth lens L4, which are arranged along optical axis Z from the object side of the imaging lens in the order mentioned above. Aperture stop St is arranged between the third lens L3 and the fourth lens L4. Since the aperture stop St is arranged between the third lens L3 and the fourth lens L4, the size of the imaging lens can be reduced in the direction of the diameter of the imaging lens.

Figure 1:
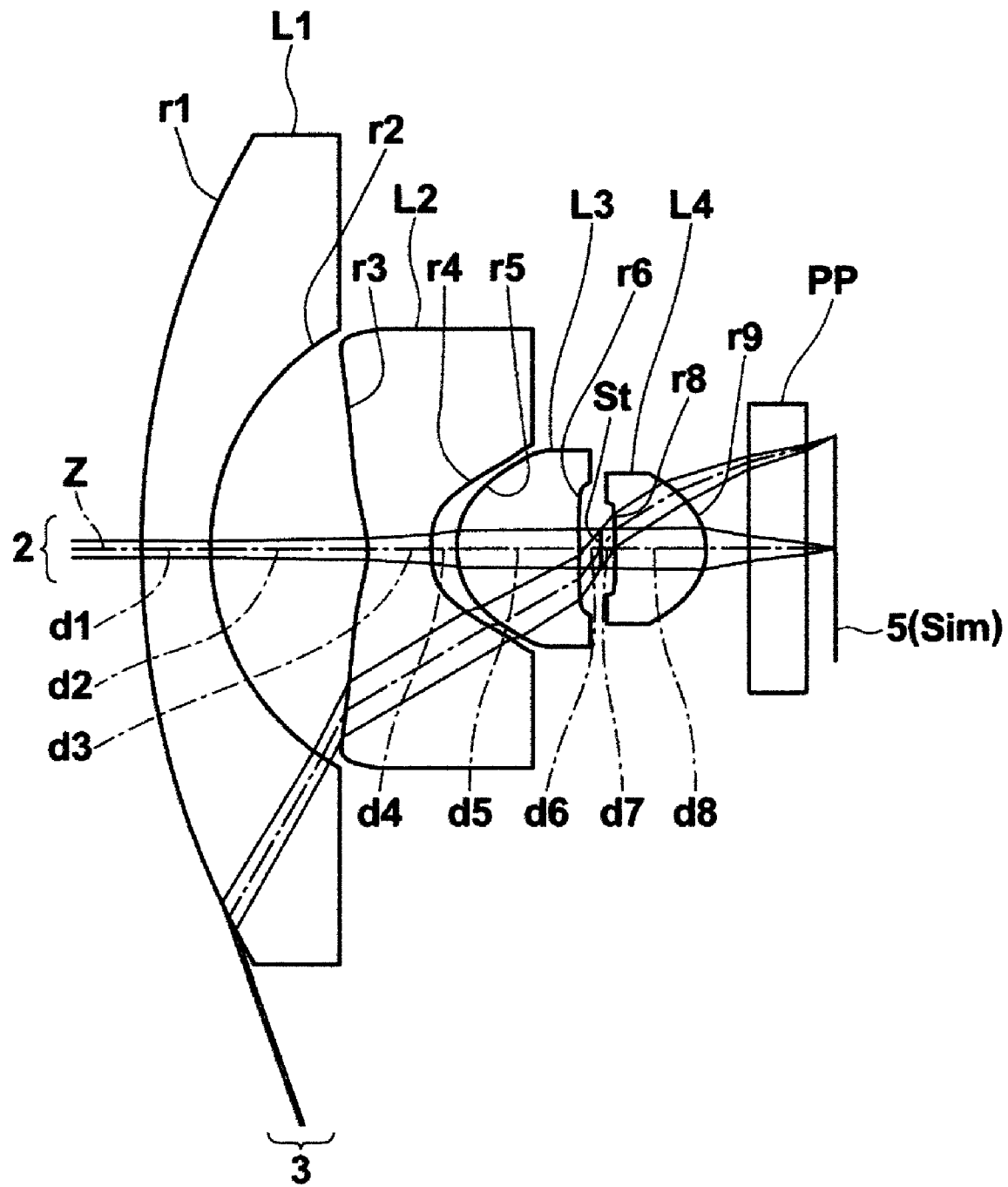
FIG. 1 is a cross section of an imaging lens in Example 1 of the present invention, illustrating the structure of the imaging lens and optical paths.
Figure 2:
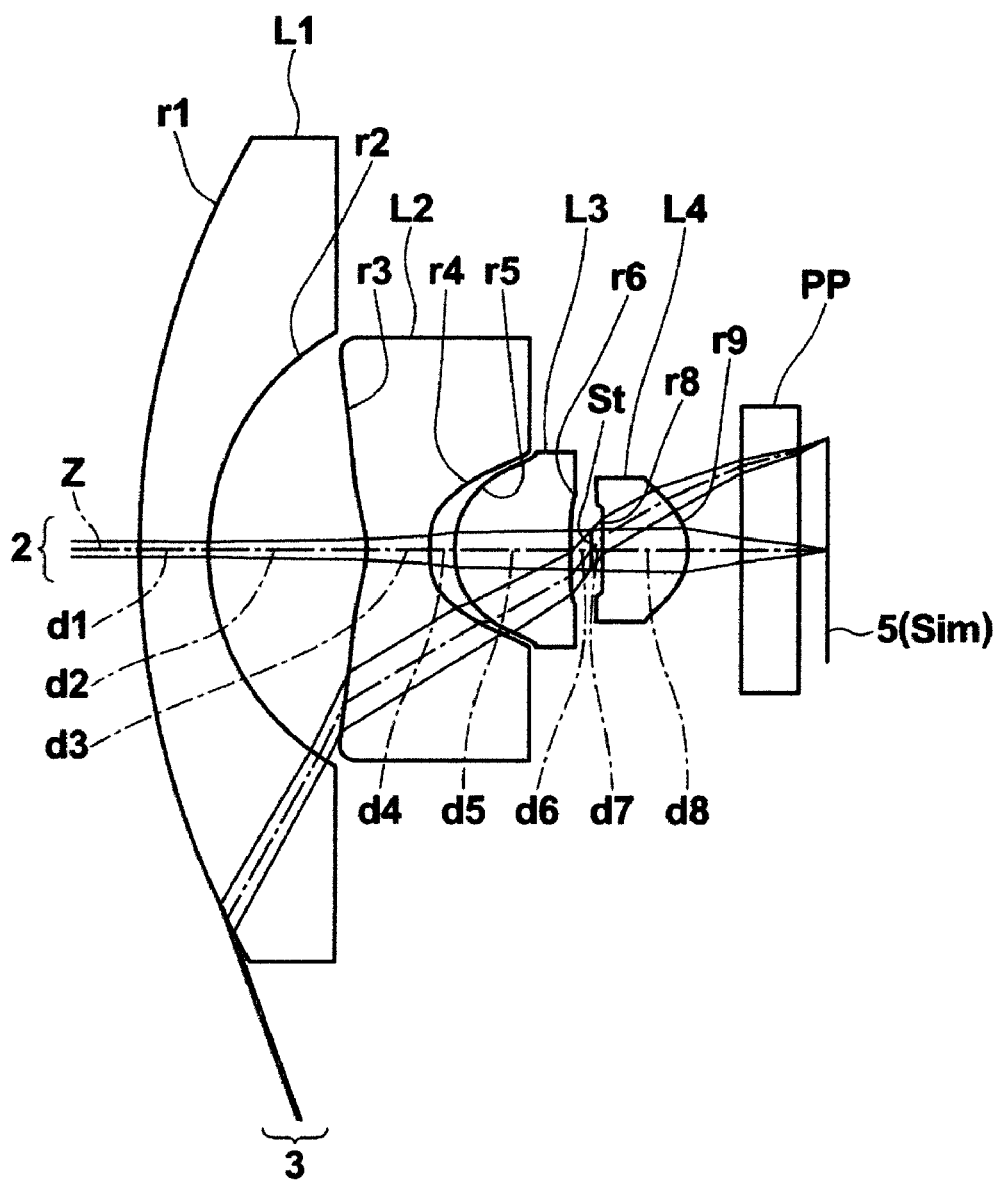
FIG. 2 is a cross section of an imaging lens in Example 2 of the present invention, illustrating the structure of the imaging lens and optical paths.
Figure 3:
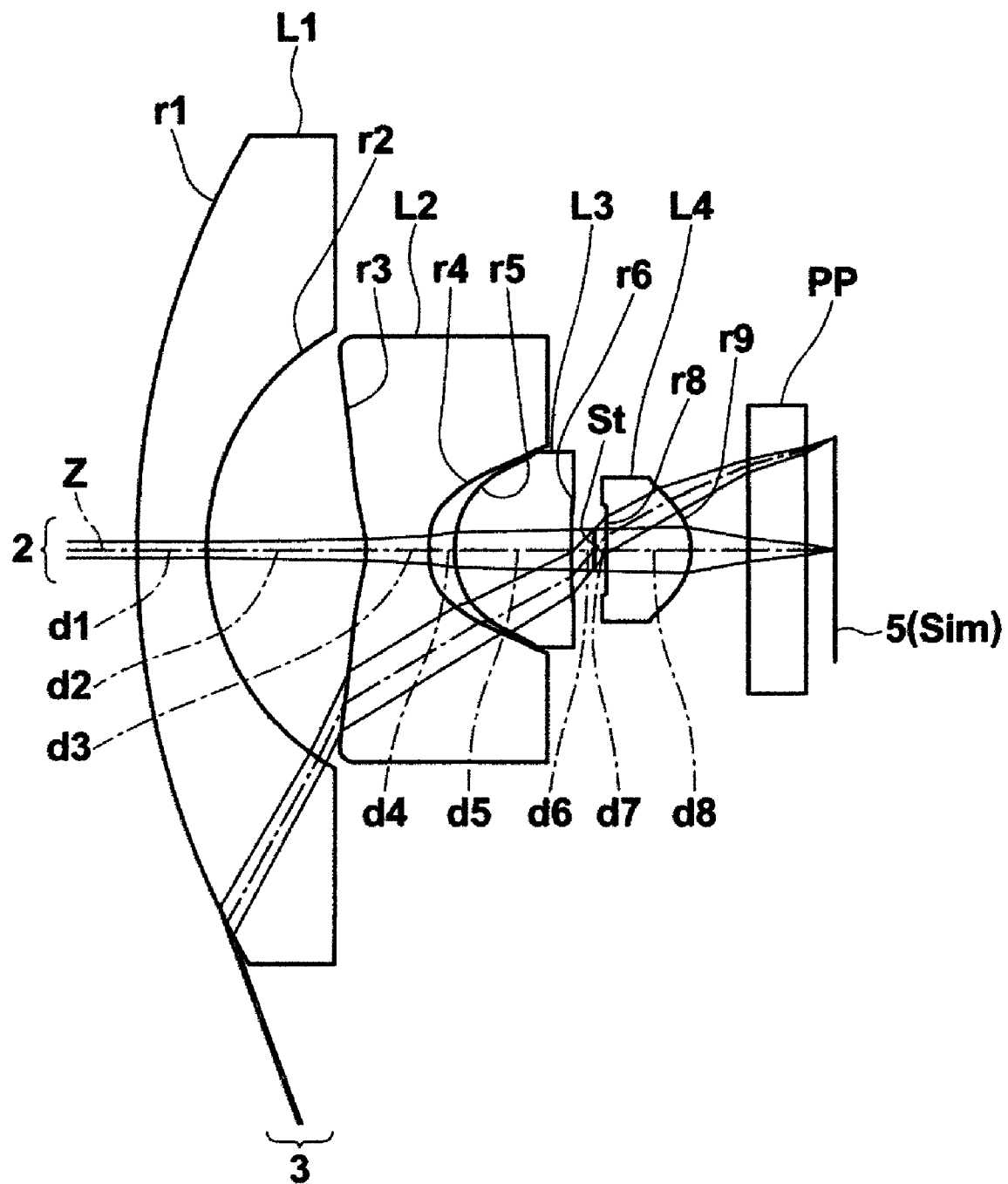
FIG. 3 is a cross section of an imaging lens in Example 3 of the present invention, illustrating the structure of the imaging lens and optical paths.
Figure 4:
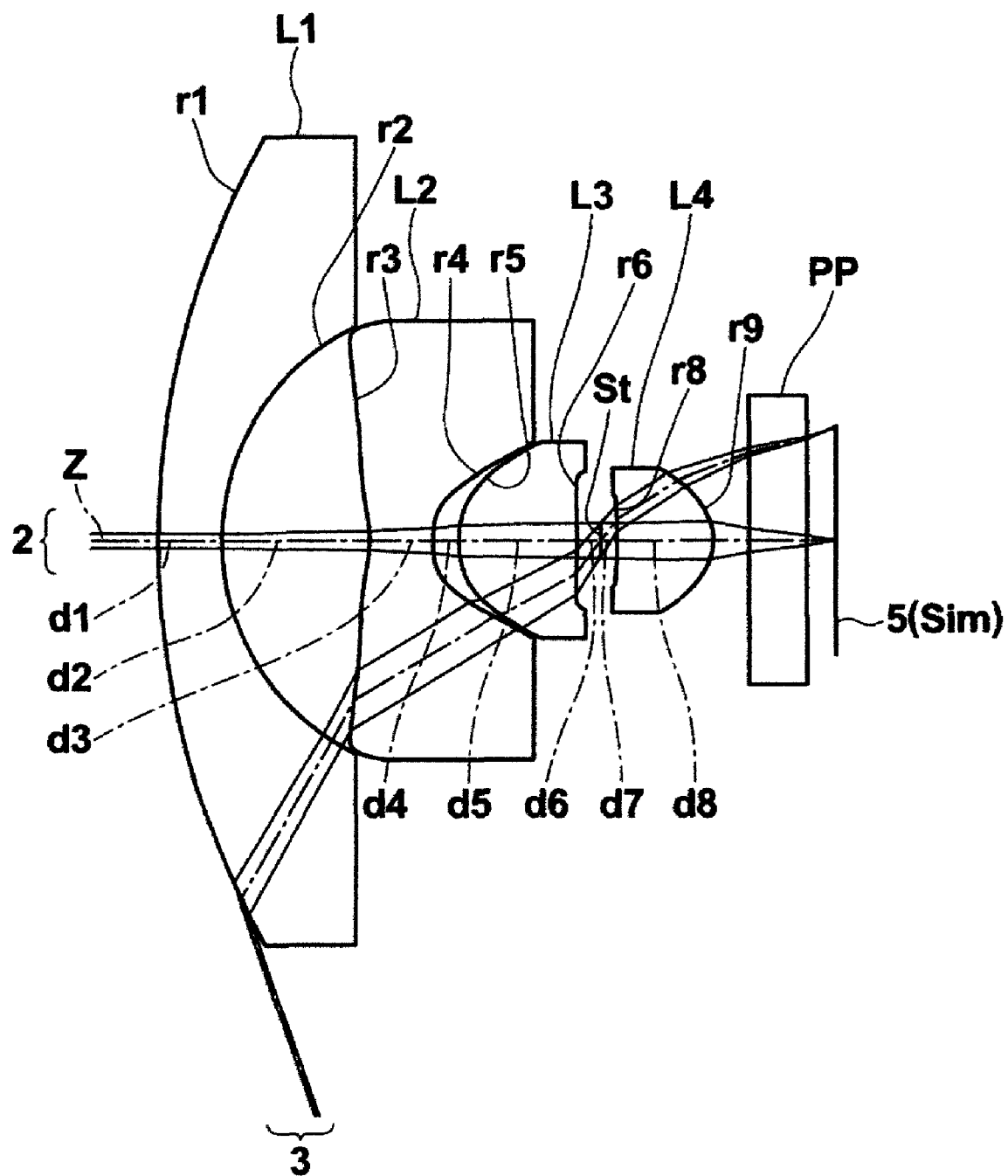
FIG. 4 is a cross section of an imaging lens in Example 4 of the present invention, illustrating the structure of the imaging lens and optical paths.
Figure 5:
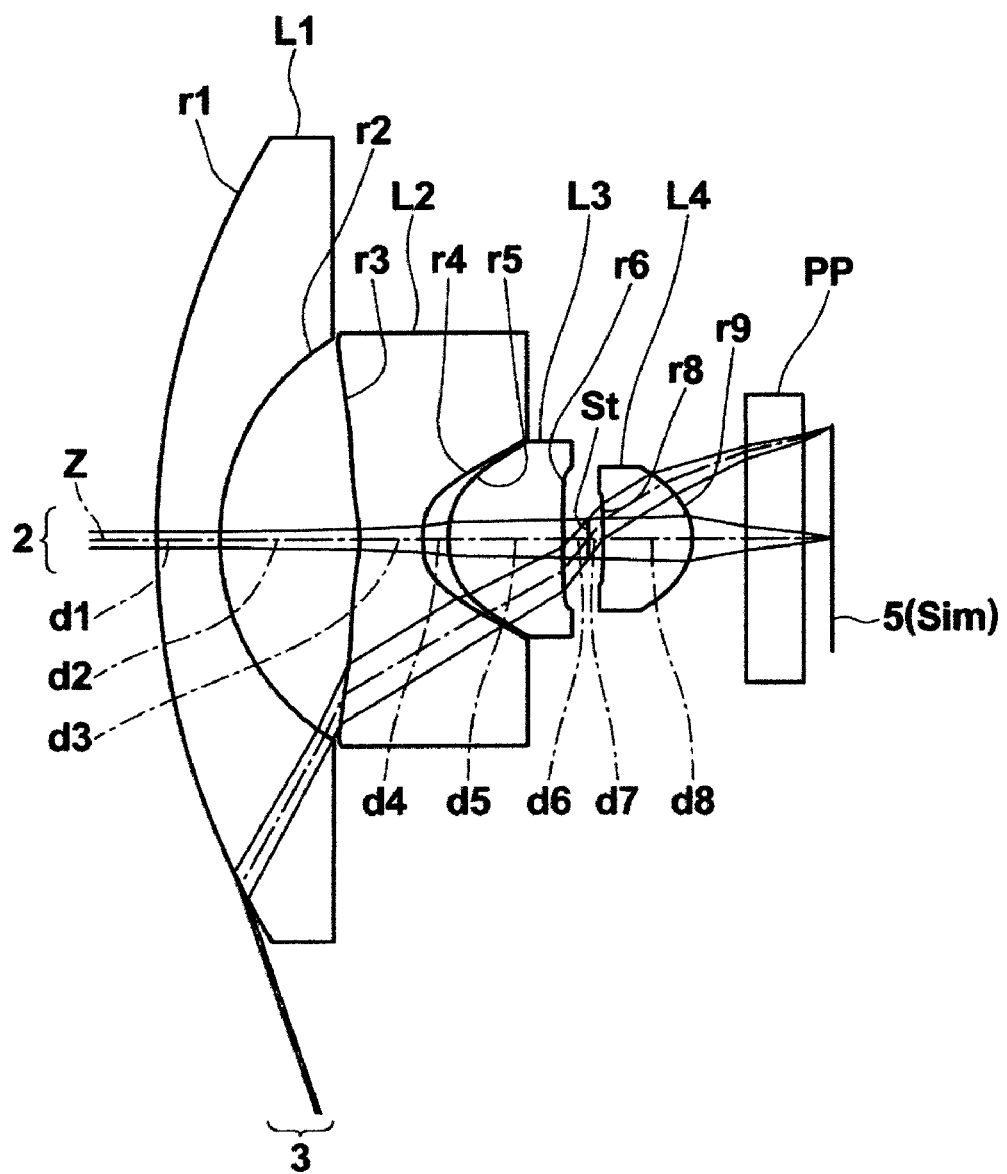
FIG. 5 is a cross section of an imaging lens in Example 5 of the present invention, illustrating the structure of the imaging lens and optical paths.
Figure 6:
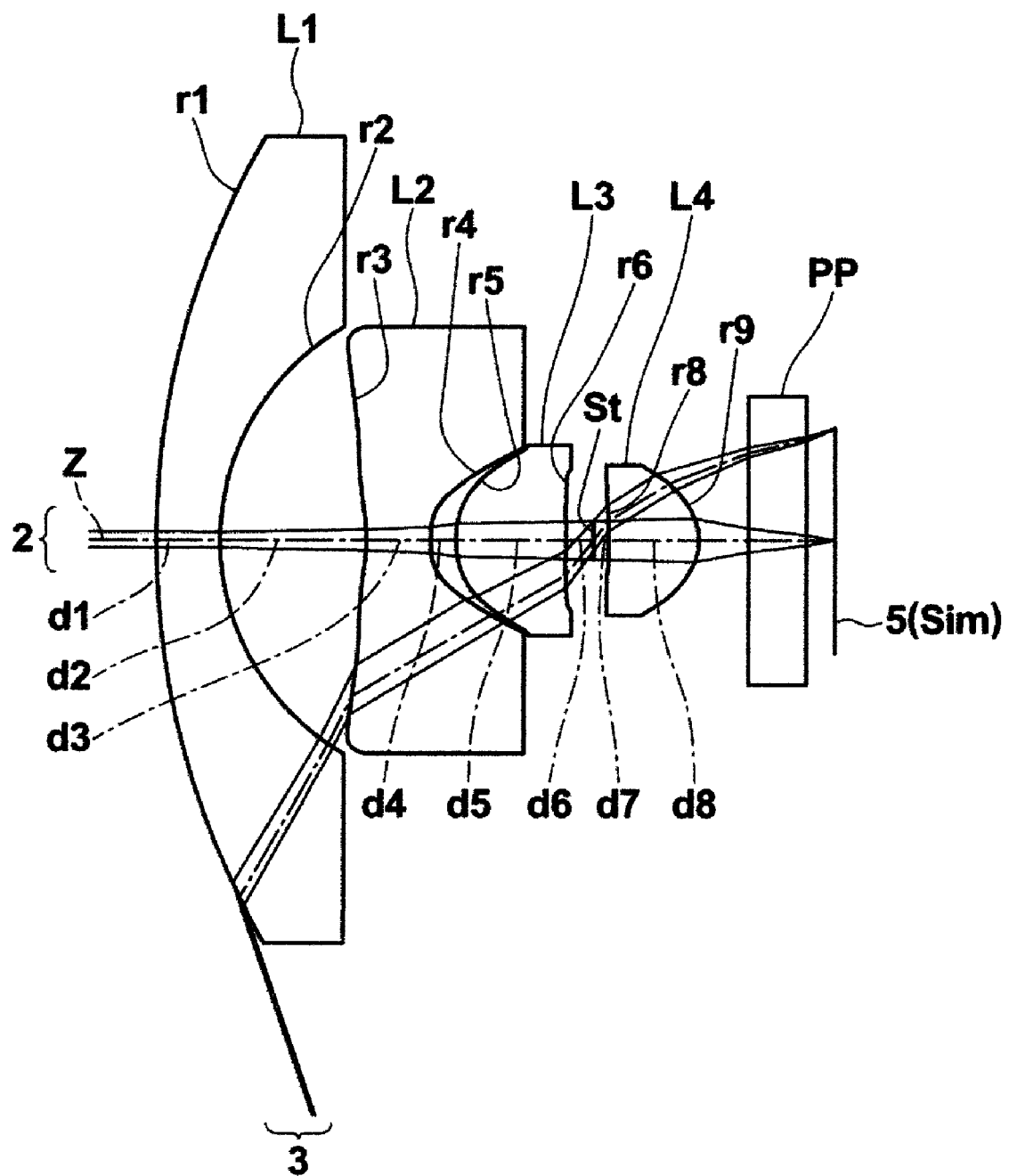
FIG. 6 is a cross section of an imaging lens in Example 6 of the present invention, illustrating the structure of the imaging lens and optical paths.

In FIG. 1, the left side is the object side of the imaging lens, and the right side is the image side of the imaging lens. Further, the aperture stop St illustrated in FIG. 1 does not necessarily represent the size nor the shape of the aperture stop St, but the position of the aperture stop St on the optical axis Z. In FIG. 1, the sign ri (i=1, 2, 3, ... ) represents the radius of curvature of each lens surface. The sign di (i=1, 2, 3, ... ) represents a distance between surfaces. Further, FIG. 1 illustrates an axial ray 2 from an object point at infinity and off-axial rays 3 at the maximum angle of view.

Further, FIG. 1 illustrates an imaging device 5 arranged on image plane Sim of an imaging lens 1, considering application of the imaging lens 1 to an imaging apparatus. In application of the imaging lens 1 to the imaging apparatus, it is desirable to set a cover glass, a low-pass filter or an infrared-ray cut filter, or the like depending on the structure of a camera on which the lens is mounted. FIG. 1 illustrates a case in which parallel-flat-plate-shaped optical member PP, assuming such an element, is arranged between the fourth lens L4 and the imaging device 5 (image plane Sim).

The first lens L1 has negative power. The first lens L1 is a meniscus lens the image-side surface of which has concave shape. The structure of the imaging lens, in which the first lens L1 is a negative meniscus lens having a concave surface facing the image side, is advantageous to increase the angle of view of the imaging lens and to correct distortion of the imaging lens. The first lens L1, which is arranged on the most object side of the imaging lens (a side closest to the object), is expected to be exposed to wind and rain, or a washing solvent or liquid. Therefore, unwanted particles, dust, water droplets, or the like may remain on the first lens L1. However, if the first lens L1 has a convex surface facing the object side, the unwanted particles, dust, water droplets, or the like does not tend to remain on the first lens L1, and that is advantageous to the imaging lens.

In the example illustrated in FIG. 1, the first lens L1 is a spherical lens. Alternatively, the first lens L1 may be an aspheric lens. Further, glass is more desirable than resin as the material of the first lens L1, which is arranged on the most object side of the imaging lens, as will be described later. Therefore, if the first lens L1 is a spherical lens, it is possible to produce the imaging lens at lower cost, compared with the case of adopting an aspheric lens as the first lens L1.

Both of the object-side surface and the image-side surface of each of the second lens L2, the third lens L3, and the fourth lens L4 are aspheric. Such use of many aspheric surfaces, which have high design flexibility, is advantageous to correction of aberrations. Further, it is possible to easily achieve high resolution, while structuring the imaging lens in small size and with a short total length by using a small number of lenses.

The second lens L2 has double concave shape in the vicinity of the optical axis (both surfaces are concave). The third lens L3 has double convex shape in the vicinity of the optical axis (both surfaces are convex). Further, the fourth lens L4 has double convex shape in the vicinity of the optical axis.

When the shapes of the second lens L2 through the fourth lens L4 in the vicinity of the optical axis are set as described above, the second lens L2 has strong negative power in the vicinity of the optical axis, and the third lens L3 has strong positive power in the vicinity of the optical axis. Further, the fourth lens L4 has strong positive power in the vicinity of the optical axis. Accordingly, it is possible to structure the imaging lens in small size by using a small number of lenses.

Further, the imaging lens according to the present embodiment is structured so as to satisfy the following formula (1):

$$0.0 < r5/r4 < 1.0 \qquad (1),$$ where r4 is a paraxial radius of curvature of the image-side surface of the second lens L2, and r5 is a paraxial radius of curvature of the object-side surface of the third lens L3.

When the value of r5/r4 exceeds the upper limit defined by the formula (1), distortion and lateral chromatic aberration at middle angles of view become large. When the value of r5/r4 is lower than the lower limit defined by the formula (1), it becomes difficult to correct coma aberration. Since it is desirable that the lenses constituting the imaging lens are arranged as close to each other as possible to reduce the size of the imaging lens, and the imaging lens of the present invention is a wide-angle lens system composed of four lenses of a negative lens, a negative lens, a positive lens and a positive lens that are arranged in this order from the object side of the imaging lens, the image-side surface of the second lens L2 and the object-side surface of the third lens L3 tend to be arranged close to each other. Consequently, as illustrated in FIG. 1, a very small gap (space) tends to be formed between the image-side surface of the second lens L2 and the object-side surface of the third lens L3. In other words, a so-called air lens is formed between the image-side surface of the second lens L2 and the object-side surface of the third lens L3. The formula (1) may be regarded as a formula defining the radius of curvature of the air lens.

In the imaging lens of the present invention, both surfaces of each of the second lens L2, the third lens L3 and the fourth lens L4 are aspheric surfaces, which have high design flexibility. Further, the concave or convex shape of each surface in the vicinity of the optical axis is set in an appropriate manner as described above, and the imaging lens is structured so as to satisfy the formula (1). Therefore, it is possible to correct various kinds of aberrations, such as curvature of field, distortion, lateral chromatic aberration and coma aberration, in an excellent manner, while structuring the imaging lens in small size by using four lenses, which are a small number of lenses, and achieving a sufficiently wide angle of view. Accordingly, high resolution is achievable for a wide image-forming region, and the imaging lens can cope with an imaging device the resolution of which became high in recent years.

Further, it is desirable that the imaging lens according to the embodiments of the present invention has the following structures. In the preferred embodiment of the present invention, the imaging lens may have any one of the structures, or at least two arbitrary structures in combination.

When r4 is a paraxial radius of curvature of the image-side surface of the second lens L2, and r5 is a paraxial radius of curvature of the object-side surface of the third lens L3, it is desirable that the following formula (1-1) is satisfied:

$$0.0 < r5/r4 < 0.5 \qquad (1-1).$$

When the formula (1-1) is satisfied, it is possible to achieve the same advantageous effect achievable by satisfying the lower limit defined by the formula (1) and to achieve a more advantageous effect than the advantageous effect achievable by satisfying the upper limit defined by the formula (1).

Further, it is more desirable that the following formula (1-2) is satisfied:

$$0.0 < r5/r4 < 0.35 \qquad (1-2).$$

When the formula (1-2) is satisfied, it is possible to achieve the same advantageous effect achievable by satisfying the lower limit defined by the formula (1) and to achieve a more advantageous effect than the advantageous effect achievable by satisfying the upper limit defined by the formula (1-1).

When r4 is a paraxial radius of curvature of the image-side surface of the second lens L2, and f is a focal length of the entire system of the imaging lens, it is desirable that the following formula (2) is satisfied:

$$0.0 < f/r4 < 0.2 \qquad (2).$$

When the value of f/r4 exceeds the upper limit defined by the formula (2), distortion and lateral chromatic aberration at middle angles of view become large. When the value of f/r4 is lower than the lower limit defined by the formula (2), it becomes difficult to correct coma aberration.

Further, it is desirable that the following formula (2-1) is satisfied:

$$0.0 < f/r4 < 0.12 \qquad (2-1).$$

When the formula (2-1) is satisfied, it is possible to achieve the same advantageous effect achievable by satisfying the lower limit defined by the formula (2) and to achieve a more advantageous effect than the advantageous effect achievable by satisfying the upper limit defined by the formula (2).

Further, it is more desirable that the following formula (2-2) is satisfied:

$$0.0 < f/r4 < 0.1 \qquad (2-2).$$

When the formula (2-2) is satisfied, it is possible to achieve the same advantageous effect achievable by satisfying the lower limit defined by the formula (2) and to achieve a more advantageous effect than the advantageous effect achievable by satisfying the upper limit defined by the formula (2-1).

When f1 is a focal length of the first lens L1, and f is a focal length of the entire system of the imaging lens, it is desirable that the following formula (3) is satisfied:

$$-12.0 < f1/f < -9.0 \qquad (3).$$

When the value of f1/f exceeds the upper limit defined by the formula (3), distortion and lateral chromatic aberration at middle angles of view become large. When the value of f1/f is lower than the lower limit defined by the formula (3), it becomes difficult to correct coma aberration, and to suppress longitudinal chromatic aberration to a practically acceptable level.

Further, it is desirable that the following formula (3-1) is satisfied:

$$-11.0 < f1/f < -9.5 \qquad (3-1).$$

When the formula (3-1) is satisfied, it is possible to achieve a more advantageous effect than the advantageous effect achievable by satisfying the formula (3).

Further, it is more desirable that the following formula (3-2) is satisfied:

$$-10.8 < f1/f < -9.8 \quad (3\text{-}2).$$

When the formula (3-2) is satisfied, it is possible to achieve a more advantageous effect than the advantageous effect achievable by satisfying the formula (3-1).

When L is a distance from the vertex of the object-side surface of the first lens L1 to image plane Sim, and f34 is a combined focal length of the third lens L3 and the fourth lens L4, it is desirable that the following formula (4) is satisfied:

$$4.0 < L/f34 < 6.0 \quad (4).$$

The distance L uses an in-air-equivalent length, as a back focal distance. The formula (4) is related to the ratio of the length of the entire system to the combined focal length of all of lenses having positive power in the paraxial region in the imaging lens.

When the value of L/f34 exceeds the upper limit defined by the formula (4), the power of the third lens L3 becomes weak, and lateral chromatic aberration is corrected insufficiently, or the power of the fourth lens L4 becomes weak, and curvature of field and coma aberration are corrected insufficiently. When the value of L/f34 exceeds the upper limit defined by the formula (4) and the power of the third lens L3 and the power of the fourth lens L4 are strong, the third lens L3 and the fourth lens L4 are too close to each, and arrangement of the lenses in the imaging lens becomes difficult. Consequently, production of the imaging lens at low cost becomes difficult. When the value of L/f34 is lower than the lower limit defined by the formula (4), the power of the third lens L3 becomes strong, and longitudinal chromatic aberration becomes too large, or the power of the fourth lens L4 becomes strong, and it becomes difficult to correct curvature of field and coma aberration. When the value of L/f34 is lower than the lower limit defined by the formula (4), and neither the power of the third lens L3 nor the power of the fourth lens L4 is strong, a distance between the third lens L3 and the fourth lens L4 becomes long, and the size of the lens system becomes large.

Further, it is desirable that the following formula (4-1) is satisfied:

$$4.0 < L/f34 < 5.5 \quad (4\text{-}1).$$

When the formula (4-1) is satisfied, it is possible to achieve the same advantageous effect achievable by satisfying the lower limit defined by the formula (4) and to achieve a more advantageous effect than the advantageous effect achievable by satisfying the upper limit defined by the formula (4).

Further, it is more desirable that the following formula (4-2) is satisfied:

$$4.0 < L/f34 < 5.0 \quad (4\text{-}2).$$

When the formula (4-2) is satisfied, it is possible to achieve the same advantageous effect achievable by satisfying the lower limit defined by the formula (4) and to achieve a more advantageous effect than the advantageous effect achievable by satisfying the upper limit defined by the formula (4-1).

Further, when L is a distance from the vertex of the object-side surface of the first lens L1 to image plane Sim, and f4 is a focal length of the fourth lens L4, it is desirable that the following formula (5) is satisfied:

$$5.0 < L/f4 < 8.0 \quad (5).$$

The distance L uses an in-air-equivalent length, as a back focal distance.

When the value of L/f4 exceeds the upper limit defined by the formula (5), it becomes difficult to correct coma aberration in an excellent manner. When the value of L/f4 is lower than the lower limit defined by the formula (5), it becomes difficult to correct spherical aberration in an excellent manner, and the lateral chromatic aberration becomes large.

Further, it is desirable that the following formula (5-1) is satisfied:

$$6.0 < L/f4 < 6.8 \quad (5\text{-}1).$$

When the formula (5-1) is satisfied, it is possible to achieve a more advantageous effect than the advantageous effect achievable by satisfying the formula (5).

Further, it is more desirable that the following formula (5-2) is satisfied:

$$6.1 < L/f4 < 6.6 \quad (5\text{-}2).$$

When the formula (5-2) is satisfied, it is possible to achieve a more advantageous effect than the advantageous effect achievable by satisfying the formula (5-1).

When r3 is a paraxial radius of curvature of the object-side surface of the second lens L2, and r4 is a paraxial radius of curvature of the image-side surface of the second lens L2, it is desirable that the following formula (6) is satisfied:

$$0.5 < (r4+r3)/(r4-r3) < 1.0 \quad (6).$$

When the value of (r4+r3)/(r4−r3) exceeds the upper limit defined by the formula (6), it becomes difficult to correct coma aberration in an excellent manner. When the value of (r4+r3)/(r4−r3) is lower than the lower limit defined by the formula (6), it becomes difficult to correct distortion and lateral chromatic aberration at middle angles of view.

Further, it is desirable that the following formula (6-1) is satisfied:

$$0.6 < (r4+r3)/(r4-r3) < 1.0 \quad (6\text{-}1).$$

When the formula (6-1) is satisfied, it is possible to achieve the same advantageous effect achievable by satisfying the upper limit defined by the formula (6) and to achieve a more advantageous effect than the advantageous effect achievable by satisfying the lower limit defined by the formula (6).

Further, it is more desirable that the following formula (6-2) is satisfied:

$$0.7 < (r4+r3)/(r4-r3) < 1.0 \quad (6\text{-}2).$$

When the formula (6-2) is satisfied, it is possible to achieve the same advantageous effect achievable by satisfying the upper limit defined by the formula (6) and to achieve a more advantageous effect than the advantageous effect achievable by satisfying the lower limit defined by the formula (6-1).

It is desirable that the Abbe number of the material of the first lens L1 for d-line is greater than or equal to 40. When such material is selected, it becomes possible to easily correct lateral chromatic aberrations in an excellent manner. Further, it is desirable that the Abbe number of the material of the second lens L2 for d-line is greater than or equal to 50. When such material is selected, it becomes possible to easily correct lateral chromatic aberrations in an excellent manner. Further, it is desirable that the Abbe number of the material of the third lens L3 for d-line is less than or equal to 40. When such material is selected, it becomes possible to easily correct lateral chromatic aberrations in an excellent manner. Further, it is more desirable that the Abbe number of the material of the third lens L3 for d-line is less than or equal to 29. When such material is selected, it becomes possible to easily correct lateral chromatic aberrations in a more excellent manner. Further, it is desirable that the Abbe number of the material of the fourth lens L4 for d-line is greater than or equal to 50. When such material is selected, it becomes possible to easily correct lateral chromatic aberrations in an excellent manner.

Therefore, it is possible to increase resolution by correcting lateral chromatic aberrations in an excellent manner. Further, the imaging lens can cope with an imaging device, the resolution of which increased in recent years.

Further, it is desirable that the full angle view of the imaging lens of the present invention is greater than 200°. The full angle of view is twice the angle formed by the principal ray of the off-axial rays 3 at the maximum angle of view and the optical axis Z. When the imaging lens is a wide angle lens system having a full angle of view exceeding 200°, it is possible to satisfy the need for wider angle lenses of recent years.

Further, as in the example illustrated in FIG. 1, it is desirable that each of all the first lens L1 through the fourth lens L4 in the imaging lens of the present invention is a single lens, which is not a cemented lens. When use of an imaging lens in tough conditions, for example, such as use in an in-vehicle camera or a monitor camera, is expected, it is desirable that no cemented lens is included in the imaging lens. Further, when no cemented lens is included in the imaging lens, it is possible to produce the imaging lens at low cost.

When the imaging lens of the present invention is used in tough conditions, for example, in an in-vehicle camera or a monitor camera, the material of the first lens L1, which is arranged on the most object side, needs to be resistant to wind and rain, which damages the surface of the lens. Further, the material of the first lens L1 needs to be resistant to a change in temperature by direct sunlight. Further, the material of the first lens L1 needs to be resistant to chemicals, such as oils and fats, and detergents. In other words, the material of the first lens L1 needs to be highly water-resistant, weather-resistant, acid-resistant, chemical-resistant, and the like. For example, it is desirable to use a material having water resistance of 1 measured by the powder method regulated by Japan Optical Glass Industry Standard (JOGIS). Further, in some cases, the material of the first lens L1 needs to be hard and not easily breakable nor crackable. If the material of the first lens is glass, it becomes possible to satisfy such need. Alternatively, transparent ceramic may be used as the material of the first lens L1.

Further, a protection means may be provided on the object-side surface of the first lens L1 to improve the strength, scratch resistance, and chemical resistance of the surface. In that case, the material of the first lens L1 may be plastic. The protection means may be a hard coating or a water-repellent coating.

It is desirable that the material of the second lens L2, the third lens L3 and the fourth lens L4 is plastic. When the material is plastic, it is possible to accurately form the aspheric shape of each of the lenses. Further, it is possible to reduce the weight of the imaging lens and the cost for production.

Some plastic materials have high water absorption characteristics, and the refractive indices of such plastic materials and the sizes of shaped plastics may change by absorption or desorption of water, or the like. Consequently, the optical performance may be adversely affected. If plastic materials having extremely low water absorption characteristics are used, it is possible to minimize the deterioration of the performance by absorption of water. Specifically, polyolefin-based plastic may be used as the material of the second lens L2 and the fourth lens L4. Further, polycarbonate-based plastic or PET-based (polyethylene-terephthalate-based) plastic may be used as the material of the third lens L3.

When plastic is used as the material of at least one of the second lens L2, the third lens L3 and the fourth lens L4, so-called nano-composite material, in which particles smaller than the wavelength of light are mixed into plastic, may be used.

In the imaging lens of the present invention, an anti-reflection coating may be applied to each lens to reduce ghost light or the like. In that case, with respect to the image-side surface of the first lens L1, the image-side surface of the second lens L2, and the object-side surface of the third lens L3 of the imaging lens illustrated in FIG. 1, an angle formed by a tangent line at a point in a peripheral area of each of the surfaces and the optical axis is small. Therefore, the thickness of the anti-reflection coating in the peripheral area is thinner than that of the anti-reflection coating in the central area of the lens. Therefore, it is possible to reduce the reflectance of the entire effective diameter in average by applying, to at least one of the aforementioned three surfaces, an anti-reflection coating the reflectance of which in the vicinity of the center becomes lowest when the wavelength of light is greater than or equal to 600 nm and less than or equal to 900 nm. Accordingly, ghost light can be reduced.

If the reflectance in the vicinity of the center of the lens is lowest when the wavelength of light is less than 600 nm, the wavelength of light that reflects at the lowest reflectance in the peripheral area of the lens becomes too short, and the reflectance for the long wavelength side becomes high. Therefore, a reddish ghost tends to be generated. In contrast, if the reflectance in the vicinity of the center of the lens is lowest when the wavelength of light is longer than 900 nm, the wavelength of light that reflects at the lowest reflectance in the central area of the lens becomes too long, and the reflectance for the short wavelength side becomes high. Therefore, the color tone (hue) of an image becomes quite reddish, and a bluish ghost tends to be generated.

In the imaging lens of the present invention, a ray of light passing the outside of the effective diameter between lenses may become stray light, and reach the image plane. Further, the stray light may cause a ghost. Therefore, it is desirable that a light cutting means for cutting the stray light is provided, if necessary. The light cutting means may be provided, for example, by applying an opaque paint to a portion of the image-side surface of a lens, the portion on the outside of the effective diameter. Alternatively, an opaque plate member may be provided at the portion on the outside of the effective diameter. Alternatively, the light cutting means may be provided by setting an opaque plate member in the optical path of rays that will become stray light.

Further, a filter that cuts light in the range of ultraviolet to blue or an IR (InfraRed) cut filter, which cuts infrared light, may be inserted between the lens system and the imaging device 5, depending on the use of the imaging lens. Alternatively, a coating that has similar properties to the aforementioned filters may be applied to the lens surface.

FIG. 1 illustrates a case in which the optical member PP, assuming various filters, is arranged between the lens system and the imaging device 5. Instead, various filters may be arranged between lenses. Alternatively, a coating that acts in a similar manner to the various filters may be applied to a surface of at least a lens in the imaging lens.

Next, examples of numerical values of the imaging lens of the present invention will be described. FIGS. 1 through 6 are cross sections of the imaging lenses in Examples 1 through 6.

Table 1 shows lens data about the imaging lens of Example 1, and Table 2 shows aspheric surface data about the imaging lens of Example 1. Similarly, Tables 3 through 12 show lens data and aspheric surface data about the imaging lenses of Examples 2 through 6. In the following descriptions, the meanings of signs in the tables will be explained by using Example 1. The meanings of the signs are basically the same for Examples 2 through 6.

In the lens data of Table 1, column si shows the surface number of the i-th surface (i=1, 2, 3, . . . ). The most object-side surface of elements constituting the lens system is the first surface, and surface numbers sequentially increase toward the image side. Further, column ri shows the radius of curvature of the i-th surface, and column di shows a distance between the i-th surface and (i+1)th surface on optical axis Z. The sign (positive/negative) of the radius of curvature is positive when the surface is convex toward the object side, and negative when the surface is convex toward the image side. In each of the examples, ri and di (i=1, 2, 3, . . . ) in the table of lens data correspond to signs ri and di in the cross section of the lens.

In the lens data of Table 1, column Nej shows the refractive index of the j-th lens (j=1, 2, 3, . . . ) for e-line (wavelength is 546.07 nm). The most-object-side lens is the first lens, and the number j sequentially increases toward the image side. Further, the column vdj shows the Abbe number of the j-th optical element for d-line (wavelength is 587.6 nm). The lens data includes aperture stop St. In the column ri of radii of curvature, "∞ (aperture stop)" is written in the box corresponding to the aperture stop St.

In FIGS. 1 through 6, optical member PP, which is arranged between the fourth lens L4 and image plane Sim, is assumed to be a cover glass, a filter or the like. In all of Examples 1 through 6, the material of the optical member PP is glass having a refractive index of 1.52, and the thickness of the optical member PP is 0.8 mm in Examples 1, 3, 4 and 6, and 1.0 mm in Examples 2 and 5.

In the lens data of Table 1, mark "*" is attached to the surface number of an aspheric surface. Further, Table 1 shows, as the radius of curvature of the aspheric surface, the numerical value of the radius of curvature in the vicinity of the optical axis (paraxial radius of curvature). The aspheric surface data in Table 2 shows the surface numbers of aspheric surfaces and aspheric coefficients related to the aspheric surfaces. In the numerical values of aspheric surface data in Table 2, "E−n" (n: integer) means "×10$^{-n}$", and "E+n" means "×10$^{n}$". Further, the aspheric coefficients are coefficients K, Bm (m=3, 4, 5, . . . 20) in the following aspheric equation:

$$Zd = C \cdot h^2 / \{1 + (1 - K \cdot C^2 \cdot h^2)^{1/2}\} + \Sigma Bm \cdot h^m, \text{ where}$$

Zd: depth of aspheric surface (the length of a perpendicular from a point on the aspheric surface at height h to a flat plane that contacts with the vertex of the aspheric surface and is perpendicular to the optical axis), h: height (the length from the optical axis to the lens surface), C: the inverse number of the paraxial radius of curvature, and K, Bm: aspheric coefficients (m=3, 4, 5, . . . 20).

TABLE 1

EXAMPLE 1 LENS DATA

| si | ri | di | Nej | vdj |
|---|---|---|---|---|
| 1 | 14.2663 | 1.2000 | 1.80810 | 46.6 |
| 2 | 4.3500 | 2.7175 | | |
| *3 | −1.1169 | 1.1000 | 1.53618 | 56.0 |
| *4 | 32.5029 | 0.4439 | | |
| *5 | 1.9859 | 2.1199 | 1.61965 | 25.5 |
| *6 | −19.3789 | 0.5714 | | |
| 7 | ∞ (APERTURE STOP) | 0.0500 | | |
| *8 | 36.2839 | 1.5795 | 1.53618 | 56.0 |
| *9 | −1.0020 | | | |

TABLE 2

EXAMPLE 1 ASPHERIC SURFACE DATA

| si | 3 | 4 | 5 | 6 | 8 | 9 |
|---|---|---|---|---|---|---|
| K | 0 | 0 | 0 | 0 | 0 | 0 |
| B3 | 3.55772E−01 | 6.88533E−01 | 2.47641E−01 | −2.32993E−02 | −1.56507E−01 | 3.58675E−02 |
| B4 | −9.47672E−02 | −6.27049E−01 | −3.29732E−01 | 2.09278E−01 | 1.37838E+00 | −5.53054E−01 |
| B5 | 8.30156E−03 | 3.18037E−01 | 3.38134E−01 | −1.92062E−01 | −8.65477E+00 | 2.21713E+00 |
| B6 | −7.98777E−04 | 4.26078E−01 | 6.67509E−02 | −1.37518E−01 | 2.79640E+01 | −3.77191E+00 |
| B7 | −3.04016E−03 | −8.65475E−02 | −3.71701E−01 | 4.67537E−01 | −5.56404E+01 | 1.89212E+00 |
| B8 | 1.41317E−03 | −3.17142E−01 | 2.86403E−01 | −3.34071E−01 | 1.00600E+02 | 9.09301E−01 |
| B9 | 1.19581E−04 | −7.58217E−02 | −9.66432E−02 | 5.12140E−03 | −2.86181E+02 | 9.69414E−01 |
| B10 | −4.63068E−05 | 8.62198E−02 | 3.20305E−02 | −1.82314E−01 | 5.68839E+02 | −1.34925E+00 |
| B11 | −1.12454E−05 | 6.05300E−02 | −2.76930E−02 | 3.18657E−01 | 7.85720E+02 | −4.76556E+00 |
| B12 | −2.92770E−06 | −1.06462E−02 | 6.13071E−03 | 8.27480E−01 | −6.57535E+03 | 6.26721E+00 |
| B13 | −1.43908E−06 | 1.57195E−02 | −5.13643E−03 | −1.50931E+00 | 1.14776E+04 | −1.39728E+00 |
| B14 | 8.96446E−07 | −8.12446E−03 | 5.18093E−03 | 5.36683E−01 | −4.49369E+03 | −4.83118E−03 |
| B15 | −4.51572E−08 | −3.08569E−03 | 3.60403E−03 | −2.90062E−01 | 2.72874E+03 | −6.14976E−01 |
| B16 | 3.33563E−08 | −6.39727E−03 | 1.23849E−03 | 6.07263E−01 | −2.68477E+04 | 4.71102E−02 |
| B17 | 2.95773E−09 | 1.05045E−03 | −2.39558E−03 | −6.43169E−01 | 1.70687E+04 | −3.26815E−01 |
| B18 | −4.33700E−09 | 9.44051E−04 | −2.20433E−04 | 4.34685E−01 | 6.09709E+04 | 6.07744E−01 |
| B19 | −6.65705E−10 | 1.32233E−03 | −5.11679E−04 | 2.36575E−01 | −9.27969E+04 | −1.85756E−01 |
| B20 | 2.45009E−10 | −5.94931E−04 | 4.26622E−04 | −2.73114E−01 | 3.74976E+04 | −1.21400E−02 |

TABLE 3

EXAMPLE 2 LENS DATA

| si | ri | di | Nej | vdj |
|---|---|---|---|---|
| 1 | 14.3342 | 1.2000 | 1.77620 | 49.6 |
| 2 | 4.3591 | 2.7547 | | |
| *3 | −1.1555 | 1.1000 | 1.53341 | 56.0 |
| *4 | 19.4375 | 0.4439 | | |
| *5 | 2.2213 | 2.0180 | 1.61965 | 25.5 |
| *6 | −104.0112 | 0.5133 | | |
| 7 | ∞ (APERTURE STOP) | 0.0500 | | |
| *8 | 22.3839 | 1.4881 | 1.53341 | 56.0 |
| *9 | −1.0113 | | | |

TABLE 4

EXAMPLE 2 ASPHERIC SURFACE DATA

| si | 3 | 4 | 5 | 6 | 8 | 9 |
|---|---|---|---|---|---|---|
| K | 0 | 0 | 0 | 0 | 0 | 0 |
| B3 | 3.50294E-01 | 6.43251E-01 | 1.77680E-01 | -5.05897E-02 | -1.41831E-01 | 8.70918E-02 |
| B4 | -9.72821E-02 | -6.50208E-01 | -2.14842E-01 | 3.36147E-01 | 1.44314E+00 | -8.37384E-01 |
| B5 | 8.65927E-03 | 4.62908E-01 | 2.92142E-01 | -2.90104E-01 | -9.40466E+00 | 2.79326E+00 |
| B6 | -6.10211E-04 | 3.17922E-01 | 3.49672E-02 | -2.10587E-01 | 3.24715E+01 | -4.09048E+00 |
| B7 | -2.99113E-03 | -1.52932E-01 | -3.55096E-01 | 5.49449E-01 | -7.01874E+01 | 1.63382E+00 |
| B8 | 1.40933E-03 | -2.42588E-01 | 2.93952E-01 | -2.67797E-01 | 1.18628E+02 | 1.07367E+00 |
| B9 | 1.13704E-04 | -7.01010E-02 | -8.86525E-02 | 2.51945E-01 | -2.49235E+02 | 1.10332E+00 |
| B10 | -4.52505E-05 | 8.33222E-02 | 2.94171E-02 | -1.05868E-01 | 5.18242E+02 | -1.31329E+00 |
| B11 | -1.17850E-05 | 5.58613E-02 | -3.22622E-02 | 7.72248E-02 | 4.30297E+02 | -4.73879E+00 |
| B12 | -2.93356E-06 | -1.11152E-02 | 7.75186E-03 | 6.23248E-02 | -5.90809E+03 | 6.12416E+00 |
| B13 | -1.40471E-06 | 1.66304E-02 | -5.99625E-03 | -5.12694E-01 | 1.18177E+04 | -1.36709E+00 |
| B14 | 8.96169E-07 | -8.77740E-03 | 5.52209E-03 | -4.22142E-01 | -4.93107E+03 | -7.15764E-02 |
| B15 | -4.38178E-08 | -5.87103E-03 | 3.52065E-03 | -1.21770E-02 | 8.73618E+02 | -6.27533E-01 |
| B16 | 3.30664E-08 | -3.19375E-03 | 1.50442E-03 | 1.32531E-01 | -2.79746E+04 | 8.86290E-02 |
| B17 | 2.91481E-09 | 9.99070E-04 | -2.06784E-03 | -1.93314E-01 | 2.71419E+04 | -1.56858E-01 |
| B18 | -4.34611E-09 | 8.32079E-04 | -3.62531E-04 | 1.76351E+00 | 5.03876E+04 | 4.62596E-01 |
| B19 | -6.61438E-10 | 6.92359E-04 | -5.13340E-04 | -3.31548E-01 | -9.03548E+04 | -1.82878E-01 |
| B20 | 2.44821E-10 | -3.47564E-04 | 3.83940E-04 | -6.25614E-01 | 3.84001E+04 | -3.00311E-05 |

TABLE 5

EXAMPLE 3 LENS DATA

| si | ri | di | Nej | νdj |
|---|---|---|---|---|
| 1 | 14.2819 | 1.2000 | 1.77620 | 49.6 |
| 2 | 4.3565 | 2.7616 | | |
| *3 | -1.1869 | 1.1000 | 1.53341 | 56.0 |
| *4 | 486.3276 | 0.4439 | | |
| *5 | 2.6983 | 2.0184 | 1.61965 | 25.5 |
| *6 | -19.7645 | 0.5548 | | |
| 7 | ∞ (APERTURE STOP) | 0.0500 | | |
| *8 | 12.3997 | 1.4655 | 1.53341 | 56.0 |
| *9 | -1.0427 | | | |

TABLE 7

EXAMPLE 4 LENS DATA

| si | ri | di | Nej | νdj |
|---|---|---|---|---|
| 1 | 14.1341 | 1.1000 | 1.77620 | 49.6 |
| 2 | 4.1108 | 2.5578 | | |
| *3 | -1.3549 | 1.1000 | 1.53340 | 55.4 |
| *4 | 482.1259 | 0.4439 | | |
| *5 | 2.9911 | 2.0417 | 1.61965 | 25.5 |
| *6 | -8.5307 | 0.6429 | | |
| 7 | ∞ (APERTURE STOP) | 0.0500 | | |
| *8 | 48.1089 | 1.6665 | 1.53340 | 55.4 |
| *9 | -0.9264 | | | |

TABLE 6

EXAMPLE 3 ASPHERIC SURFACE DATA

| si | 3 | 4 | 5 | 6 | 8 | 9 |
|---|---|---|---|---|---|---|
| K | 0 | 0 | 0 | 0 | 0 | 0 |
| B3 | 3.45456E-01 | 6.52060E-01 | 2.13332E-01 | -6.07658E-03 | -3.42136E-01 | 1.15009E-01 |
| B4 | -9.75587E-02 | -6.01576E-01 | -2.21402E-01 | 2.19151E-01 | 2.53781E+00 | -9.19464E-01 |
| B5 | 8.70798E-03 | 4.39415E-01 | 2.76647E-01 | -2.63934E-01 | -1.15848E+01 | 2.88733E+00 |
| B6 | -5.17971E-04 | 3.15306E-01 | 3.58433E-02 | -2.96854E-02 | 3.20910E+01 | -4.08418E+00 |
| B7 | -2.99679E-03 | -1.85811E-01 | -3.56349E-01 | 5.54843E-01 | -6.68348E+01 | 1.60983E+00 |
| B8 | 1.41595E-03 | -2.48528E-01 | 3.02734E-01 | -4.76469E-01 | 1.20410E+02 | 8.99231E-01 |
| B9 | 1.12947E-04 | -3.17142E-02 | -9.61491E-02 | 5.28978E-02 | -2.23306E+02 | 1.28254E+00 |
| B10 | -4.55984E-05 | 8.45979E-02 | 3.28680E-02 | -1.24201E-01 | 4.54863E+02 | -1.26282E+00 |
| B11 | -1.19924E-05 | 5.17799E-02 | -2.74327E-02 | 1.29734E-01 | 3.33436E+02 | -4.76869E+00 |
| B12 | -2.94947E-06 | -1.27092E-02 | 5.46126E-03 | 5.31692E-01 | -5.67830E+03 | 6.06466E+00 |
| B13 | -1.39194E-06 | 1.30616E-02 | -8.25219E-03 | -5.83763E-01 | 1.18807E+04 | -1.33303E+00 |
| B14 | 8.91625E-07 | -9.34045E-03 | 5.83918E-03 | -1.33229E-01 | -5.01877E+03 | -4.55241E-02 |
| B15 | -4.13919E-08 | -5.48959E-03 | 3.57792E-03 | 8.12602E-02 | 5.24260E+02 | -7.40283E-01 |
| B16 | 3.30745E-08 | -2.45120E-03 | 1.67066E-03 | -1.46189E-01 | -2.74057E+04 | -6.74233E-02 |
| B17 | 2.92945E-09 | 1.02900E-03 | -1.79543E-03 | -4.60547E-01 | 2.78405E+04 | 3.69841E-01 |
| B18 | -4.36477E-09 | 9.18349E-04 | -6.85882E-04 | 1.29918E+00 | 4.43685E+04 | 8.12577E-02 |
| B19 | -6.58676E-10 | 5.96614E-04 | -4.33347E-04 | -3.81957E-01 | -8.06594E+04 | -1.11452E-01 |
| B20 | 2.43813E-10 | -3.48813E-04 | 3.99631E-04 | -1.77986E-01 | 3.36287E+04 | 8.78629E-03 |

TABLE 8

EXAMPLE 4 ASPHERIC SURFACE DATA

| si | 3 | 4 | 5 | 6 | 8 | 9 |
|---|---|---|---|---|---|---|
| K | 0 | 0 | 0 | 0 | 0 | 0 |
| B3 | 3.31724E−01 | 7.23641E−01 | 3.29948E−01 | 1.79324E−02 | 1.30391E−01 | 1.07630E−01 |
| B4 | −9.84286E−02 | −5.15610E−01 | −3.23722E−01 | 1.63099E−01 | −1.42754E+00 | −8.87650E−01 |
| B5 | 8.54765E−03 | 3.75495E−01 | 3.21426E−01 | −3.11678E−01 | 2.70107E+00 | 2.86916E+00 |
| B6 | −5.06418E−04 | 2.90164E−01 | 3.65941E−02 | 8.00877E−02 | 1.72700E+01 | −4.12754E+00 |
| B7 | −2.97624E−03 | −1.87131E−01 | −3.55934E−01 | 4.61247E−01 | −1.16005E+02 | 1.64737E+00 |
| B8 | 1.43933E−03 | −2.36260E−01 | 3.04225E−01 | −4.05123E−01 | 2.56208E+02 | 9.27964E−01 |
| B9 | 1.11682E−04 | −3.40217E−02 | −1.03584E−01 | −5.28966E−02 | −2.44764E+02 | 1.26283E+00 |
| B10 | −4.54896E−05 | 8.02791E−02 | 3.06540E−02 | −3.14003E−01 | 3.37553E+02 | −1.23575E+00 |
| B11 | −1.22659E−05 | 5.61206E−02 | −2.60844E−02 | 3.64803E−01 | 2.56704E+01 | −4.78930E+00 |
| B12 | −2.96010E−06 | −1.45366E−02 | 3.17014E−03 | 5.47454E−01 | −5.11640E+03 | 5.97614E+00 |
| B13 | −1.40888E−06 | 1.06730E−02 | −4.84801E−03 | −3.39420E−01 | 1.20725E+04 | −1.28573E+00 |
| B14 | 8.92306E−07 | −8.97840E−03 | 4.89392E−03 | −1.72187E−01 | −5.03250E+03 | −4.96596E−02 |
| B15 | −4.38388E−08 | −4.79673E−03 | 2.89659E−03 | −4.31754E−02 | −9.33913E+02 | −7.04167E−01 |
| B16 | 3.33128E−08 | −1.75237E−03 | 2.04050E−03 | −8.81009E−02 | −2.58986E+04 | −1.42738E−02 |
| B17 | 2.98323E−09 | 8.18736E−04 | −2.53706E−03 | −1.69928E−01 | 2.83049E+04 | 3.51491E−01 |
| B18 | −4.32091E−09 | 7.11272E−04 | 1.18633E−04 | 3.74183E−01 | 4.03996E+04 | −5.75321E−02 |
| B19 | −6.20983E−10 | 6.68789E−04 | −5.80459E−04 | 6.73019E−02 | −7.50272E+04 | 2.63638E−03 |
| B20 | 2.33047E−10 | −3.58305E−04 | 3.61968E−04 | −1.32883E−01 | 3.10474E+04 | −1.37522E−02 |

TABLE 9

EXAMPLE 5 LENS DATA

| si | ri | di | Nej | νdj |
|---|---|---|---|---|
| 1 | 13.2770 | 1.1000 | 1.77620 | 49.6 |
| 2 | 4.0892 | 2.4270 | | |
| *3 | −1.4439 | 1.1000 | 1.53340 | 55.4 |
| *4 | 11.2309 | 0.4439 | | |
| *5 | 2.9184 | 1.9976 | 1.61965 | 25.5 |
| *6 | −14.5539 | 0.6449 | | |
| 7 | ∞ (APERTURE STOP) | 0.0500 | | |
| *8 | 168.4984 | 1.5551 | 1.53340 | 55.4 |
| *9 | −0.9813 | | | |

TABLE 11

EXAMPLE 6 LENS DATA

| si | ri | di | Nej | νdj |
|---|---|---|---|---|
| 1 | 13.9693 | 1.1000 | 1.77620 | 49.6 |
| 2 | 4.2634 | 2.5372 | | |
| *3 | −1.5441 | 1.1000 | 1.53340 | 55.4 |
| *4 | 9.2453 | 0.4439 | | |
| *5 | 3.0626 | 1.9056 | 1.61965 | 25.5 |
| *6 | −10.8856 | 0.6826 | | |
| 7 | ∞ (APERTURE STOP) | 0.0500 | | |
| *8 | 65.0607 | 1.5676 | 1.53340 | 55.4 |
| *9 | −0.9742 | | | |

TABLE 10

EXAMPLE 5 ASPHERIC SURFACE DATA

| si | 3 | 4 | 5 | 6 | 8 | 9 |
|---|---|---|---|---|---|---|
| K | 0 | 0 | 0 | 0 | 0 | 0 |
| B3 | 3.23877E−01 | 7.27299E−01 | 3.27822E−01 | 7.34440E−03 | 5.90332E−02 | 1.21821E−01 |
| B4 | −9.87355E−02 | −5.30112E−01 | −3.69006E−01 | 1.58222E−01 | −8.97831E−01 | −9.62453E−01 |
| B5 | 7.99538E−03 | 3.22570E−01 | 3.59341E−01 | −1.84982E−01 | 1.68660E+00 | 2.88495E+00 |
| B6 | −5.58210E−04 | 2.93048E−01 | 4.96691E−02 | −3.04807E−03 | 1.53632E+01 | −3.72960E+00 |
| B7 | −2.89673E−03 | −1.38973E−01 | −3.63861E−01 | 4.05492E−01 | −1.06715E+02 | 8.99127E−01 |
| B8 | 1.45859E−03 | −2.33092E−01 | 3.00033E−01 | −4.16890E−01 | 2.43228E+02 | 1.29781E+00 |
| B9 | 1.08724E−04 | −4.62312E−02 | −1.07046E−01 | −2.10953E−02 | −2.19108E+02 | 1.29139E+00 |
| B10 | −4.60430E−05 | 7.66441E−02 | 3.57927E−02 | −2.21941E−01 | 2.97166E+02 | −1.17118E+00 |
| B11 | −1.22300E−05 | 5.01351E−02 | −2.76204E−02 | 2.51093E−01 | −4.83309E+01 | −4.80801E+00 |
| B12 | −2.97705E−06 | −1.18559E−02 | 2.74535E−03 | 5.57693E−01 | −4.98780E+03 | 5.88530E+00 |
| B13 | −1.42331E−06 | 9.17143E−03 | −3.34433E−03 | −3.27665E−01 | 1.24929E+04 | −1.28826E+00 |
| B14 | 8.94436E−07 | −6.76429E−03 | 4.15945E−03 | −1.10785E−01 | −5.70003E+03 | −2.33402E−02 |
| B15 | −4.49373E−08 | −3.85156E−03 | 2.97536E−03 | −1.12494E−01 | −1.59637E+03 | −6.99540E−01 |
| B16 | 3.24005E−08 | −1.71271E−03 | 1.93478E−03 | −2.11092E−02 | −2.43790E+04 | −1.78593E−02 |
| B17 | 3.50956E−09 | 5.64951E−04 | −2.47733E−03 | −1.98123E−01 | 2.78771E+04 | 3.46236E−01 |
| B18 | −4.32793E−09 | 2.44306E−04 | 9.50012E−05 | 3.39566E−01 | 4.03818E+04 | −4.87946E−02 |
| B19 | −6.30477E−10 | 8.30814E−04 | −6.05939E−04 | 7.98373E−02 | −7.56348E+04 | 5.90077E−03 |
| B20 | 2.32406E−10 | −3.39045E−04 | 3.80546E−04 | −1.27379E−01 | 3.14633E+04 | −1.81925E−02 |

TABLE 12

EXAMPLE 6 ASPHERIC SURFACE DATA

| si | 3 | 4 | 5 | 6 | 8 | 9 |
|---|---|---|---|---|---|---|
| K | 0 | 0 | 0 | 0 | 0 | 0 |
| B3 | 3.08746E−01 | 7.58219E−01 | 3.71626E−01 | 1.52682E−02 | 4.95130E−02 | 1.27588E−01 |
| B4 | −9.58528E−02 | −5.14886E−01 | −4.30582E−01 | 1.51791E−01 | −8.51843E−01 | −1.00038E+00 |
| B5 | 8.12715E−03 | 2.43705E−01 | 4.00929E−01 | −2.09959E−01 | 1.60428E+00 | 2.97736E+00 |
| B6 | −6.42901E−04 | 3.25136E−01 | 5.10653E−02 | 4.54238E−02 | 1.50496E+01 | −3.80323E+00 |
| B7 | −2.87343E−03 | −1.15516E−01 | −3.80937E−01 | 3.86937E−01 | −1.05674E+02 | 9.01559E−01 |
| B8 | 1.46564E−03 | −2.39981E−01 | 3.02342E−01 | −4.20148E−01 | 2.38010E+02 | 1.29408E+00 |
| B9 | 1.03817E−04 | −4.85307E−02 | −1.01779E−01 | −2.85916E−02 | −1.82366E+02 | 1.29762E+00 |
| B10 | −4.61403E−05 | 7.34058E−02 | 3.68756E−02 | −2.29727E−01 | 2.18528E+02 | −1.08584E+00 |
| B11 | −1.20774E−05 | 5.00071E−02 | −2.49782E−02 | 2.43908E−01 | −5.80371E+01 | −4.86397E+00 |
| B12 | −2.97108E−06 | −1.25092E−02 | 8.59198E−04 | 5.86481E−01 | −4.94651E+03 | 5.79810E+00 |
| B13 | −1.41813E−06 | 8.84932E−03 | −6.57292E−03 | −3.20594E−01 | 1.29822E+04 | −1.25877E+00 |
| B14 | 8.96607E−07 | −6.32336E−03 | 4.06514E−03 | −9.68380E−02 | −6.33520E+03 | 1.16777E−02 |
| B15 | −4.65622E−08 | −2.93247E−03 | 3.21901E−03 | −1.01737E−01 | −2.14810E+03 | −6.30492E−01 |
| B16 | 3.25922E−08 | −1.74051E−03 | 2.36447E−03 | −1.01457E−01 | −2.41226E+04 | −3.92293E−02 |
| B17 | 3.47366E−09 | 5.34920E−04 | −1.98438E−03 | −1.69356E−01 | 3.01333E+04 | 2.54806E−01 |
| B18 | −4.34125E−09 | 3.34232E−05 | 6.32528E−05 | 3.49230E−01 | 3.82003E+04 | −1.88165E−02 |
| B19 | −6.34780E−10 | 8.48748E−04 | −6.50616E−04 | 9.39323E−02 | −7.57968E+04 | 3.80863E−02 |
| B20 | 2.35570E−10 | −3.18205E−04 | 3.15776E−04 | −1.38148E−01 | 3.20108E+04 | −3.21156E−02 |

In Examples 1 through 6, the material of the first lens L1 is optical glass, and both surfaces (the object-side surface and the image side surface) of the first lens L1 are spherical. Therefore, the first lens L1 has excellent weather resistance, and is not easily scratchable by earth and sand, or the like. Further, it is possible to produce the first lens L1 at relatively low cost. In Examples 1 through 6, the material of the second lens L2 and the fourth lens L4 are polyolefin-based plastic, and the material of the third lens L3 is polycarbonate-based plastic. The plastics having low water absorption characteristics are selected as the materials of these lenses to minimize fluctuation in the performance of the lenses by absorption of water.

Table 13 shows various data about the imaging lenses of Examples 1 through 6 and values corresponding to formulas (1) through (6). In Examples 1 through 6, e-line is reference wavelength, and Table 13 shows values at the reference wavelength.

In Table 13, f is the focal length of the entire system of the imaging lens, and Bf is the length from the image-side surface of the most-image-side lens to image plane Sim on the optical axis (corresponding to back focus). Further, L is the length from the object-side surface of the first lens L1 to the image plane Sim on the optical axis. Further, Fno. is F-number, and 2ω is a full angle of view. The value of Bf is a length in air (an in-air-equivalent length). Specifically, an in-air-equivalent length is used as the thickness of optical member PP to calculate the back focus Bf. Similarly, the back focal distance in the length L is a length in air. In all of Examples 1 through 6, the maximum image height is 1.95 mm. As Table 13 shows, all of Examples 1 through 6 satisfy formulas (1) through (6).

TABLE 13

|  | EXAMPLE 1 | EXAMPLE 2 | EXAMPLE 3 | EXAMPLE 4 | EXAMPLE 5 | EXAMPLE 6 |
|---|---|---|---|---|---|---|
| f | 0.805 | 0.810 | 0.809 | 0.747 | 0.805 | 0.803 |
| Bf | 1.852 | 2.040 | 2.013 | 1.768 | 2.054 | 1.988 |
| L | 11.634 | 11.607 | 11.607 | 11.370 | 11.373 | 11.375 |
| Fno. | 2.8 | 2.8 | 2.8 | 2.8 | 2.8 | 2.8 |
| 2ω | 219.0° | 219.8° | 220.2° | 218.2° | 217.6° | 218.2° |
| r5/r4 | 0.061 | 0.114 | 0.006 | 0.006 | 0.260 | 0.331 |
| f/r4 | 0.025 | 0.042 | 0.002 | 0.002 | 0.072 | 0.087 |
| f1/f | −10.164 | −10.510 | −10.534 | −10.499 | −9.973 | −10.352 |
| L/f34 | 4.165 | 4.688 | 4.972 | 4.790 | 4.769 | 4.879 |
| L/f4 | 6.303 | 6.257 | 6.193 | 6.594 | 6.198 | 6.269 |
| (r4 + r3)/(r4 − r3) | 0.934 | 0.888 | 0.995 | 0.994 | 0.772 | 0.714 |

In Tables 1 through 13, values are rounded to predetermined digits. The unit of the numerical values is "°" for angles, and "mm" for lengths. However, these units are only examples. Since an optical system can achieve similar optical performance when the optical system is proportionally enlarged or reduced, other appropriate units may be used.

FIGS. 7A through 7G are diagrams illustrating aberrations of the imaging lens in Example 1. FIGS. 7A through 7D illustrate spherical aberrations, astigmatism, distortion, and lateral chromatic aberrations (chromatic aberrations of magnification), respectively. FIGS. 7E through 7G illustrate transverse aberrations in tangential direction at respective half angles of view. FIGS. 7A through 7G illustrate aberrations when e-line is reference wavelength. Further, in FIGS. 7A and 7D, which illustrate spherical aberrations and lateral chromatic aberrations respectively, aberrations for g-line (wavelength is 436 nm) and aberrations for C-line (wavelength is 656.27 nm) are also illustrated. In the diagram illustrating spherical aberrations, Fno. represents F-number, and in the other diagrams, ω represents half angles of view.

Similarly, FIGS. 8A through 8G, 9A through 9G, 10A through 10G, 11A through 11G, and 12A through 12G illustrate spherical aberrations, astigmatism, distortion, lateral chromatic aberrations, and transverse aberrations of imaging lenses in Examples 2 through 6, respectively.

In the diagrams illustrating distortion, shift amounts from ideal image heights "2×f×tan (φ/2)" are illustrated by using focal length f of the entire system of the imaging lens and half angle φ of view (variable, 0≦φ≦ω). Therefore, the values are minus in the peripheral area. However, when the distortions of the imaging lenses in Examples 1 through 6 are calculated with respect to image heights based on equidistant projection, the distortions are large plus values. This is because the imaging lenses of Examples 1 through 6 are designed so that images of the peripheral areas are large, compared with lenses that are designed to suppress distortion at image heights based on equidistant projection.

As the above data show, each of the imaging lenses of Examples 1 through 6 is composed of a small number of lenses, i.e., four lenses. Therefore, the sizes of the imaging lenses are small, and the cost for producing the imaging lenses is low. Further, the imaging lenses of Examples 1 through 6 have extremely wide angles of view of approximately 220° and small F-numbers of 2.8. Further, each aberration is corrected in an excellent manner, and the imaging lenses have high resolution and excellent optical performance. These imaging lenses are appropriate for use in monitor cameras and in-vehicle cameras for imaging the front side, the left and/or right side, the rear side, or the like of a car.

Figure 13:
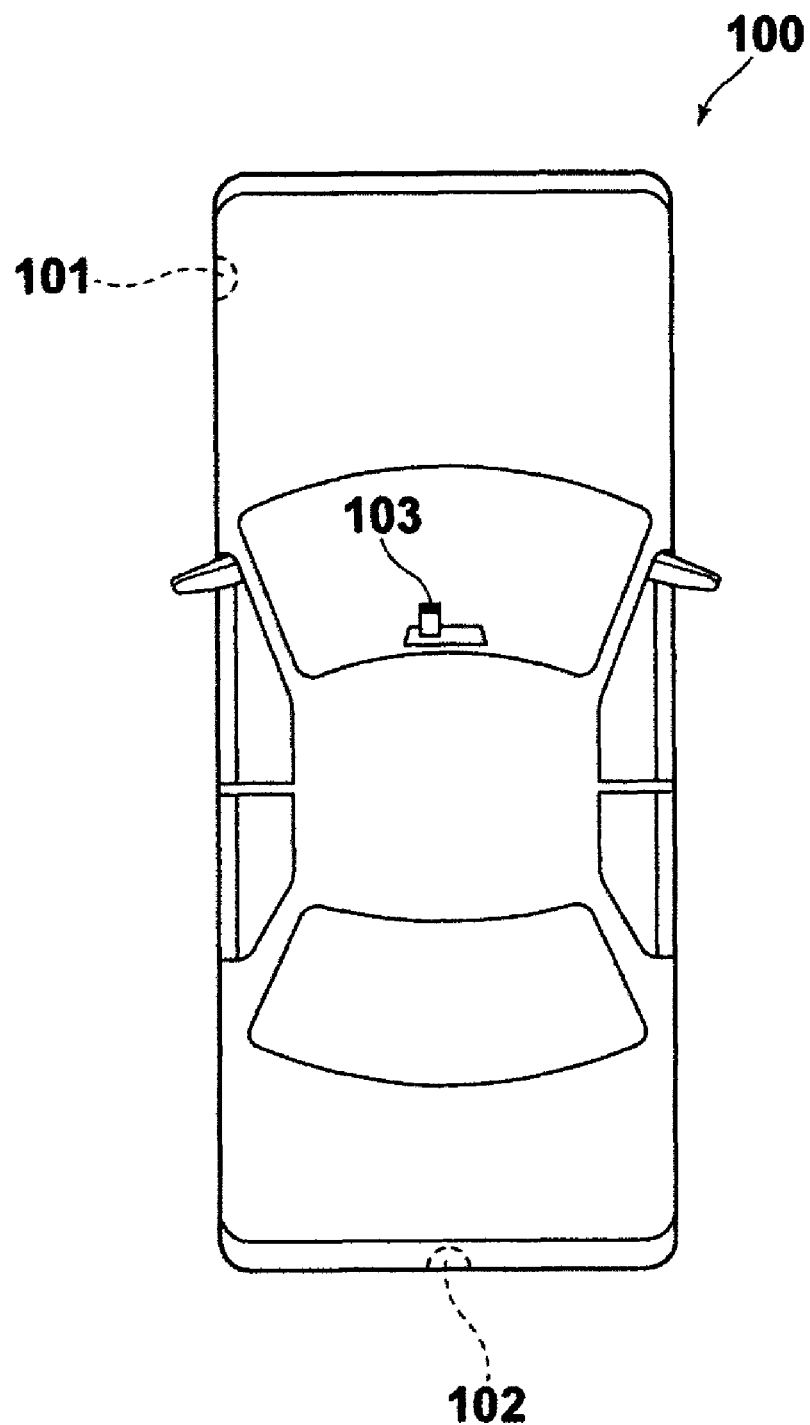
FIG. 13 is a diagram for explaining the arrangement of an imaging apparatus for in-vehicle use according to an embodiment of the present invention.

FIG. 13 illustrates a manner of mounting an imaging apparatus including the imaging lens according to the embodiment of the present invention on a car 100. In FIG. 13, an exterior camera 101, an exterior camera 102, and an interior camera 103 are provided in the car 100. The exterior camera 101 images the driver's blind spot on a side of the car 100, which is the side of the seat next to the driver. The exterior camera 102 images the driver's blind spot on the rear side of the car 100. The interior camera 103 is attached to the back side of a rearview mirror, and images the same range as the driver's visual field. The exterior camera 101, the exterior camera 102, and the interior camera 103 are imaging apparatuses according to the embodiment of the present invention. Each of the exterior camera 101, the exterior camera 102, and the interior camera 103 includes an imaging lens according to an embodiment of the present invention and an imaging device for converting an optical image formed by the imaging lens into electric signals.

The imaging lenses in the embodiments and the examples of the present invention have the aforementioned advantages. Therefore, the exterior cameras 101 and 102, and the interior camera 103 can be structured in small size and produced at low cost. Further, the exterior cameras 101 and 102, and the interior camera 103 have wide angles of view, and can obtain high-resolution images or video images in an excellent manner.

The present invention has been described by using embodiments and examples. However, the present invention is not limited to the aforementioned embodiments nor examples, and various modifications are possible. For example, the values of the radius of curvature, a distance between surfaces, refractive index, and Abbe number of each lens element are not limited to the values in the examples of numerical values, but may be other values. Further, the material of the lenses is not limited to the materials used in the examples of numerical values, but may be other materials.

In the embodiment of the imaging apparatus, a case in which the imaging lens is applied to an in-vehicle camera was described. However, the use of the imaging apparatus of the present invention is not limited to the in-vehicle camera. For example, the imaging apparatus of the present invention may be applied to a camera for a mobile terminal, a monitor camera, and the like.

What is claimed is:

1. An imaging lens comprising:
a first lens having negative power, and which is a meniscus lens the image-side surface of which has concave shape;
a second lens, the object-side surface and the image-side surface of which are aspheric, and which has double concave shape in the vicinity of an optical axis;
a third lens, the object-side surface and the image-side surface of which are aspheric, and which has double convex shape in the vicinity of the optical axis;
a stop; and
a fourth lens, the object-side surface and the image-side surface of which are aspheric, and which has double convex shape in the vicinity of the optical axis, and the first lens, the second lens, the third lens, the stop and the fourth lens being arranged from the object side of the imaging lens in the order mentioned above,
wherein the following formula (1) is satisfied:

$$0.0 < r5/r4 < 1.0 \quad (1),\text{ where}$$

r4 is a paraxial radius of curvature of the image-side surface of the second lens, and
r5 is a paraxial radius of curvature of the object-side surface of the third lens.

2. Imaging lens, as defined in claim 1, wherein the following formula (2) is satisfied:

$$0.0 < f/r4 < 0.2 \quad (2),\text{ where}$$

f is a focal length of the entire system of the imaging lens.

3. An imaging lens, as defined in claim 1, wherein the following formula (3) is satisfied:

$$-12.0 < f1/f < -9.0 \quad (3),\text{ where}$$

f1 is a focal length of the first lens, and
f is a focal length of the entire system of the imaging lens.

4. Imaging lens, as defined in claim 1, wherein the following formula (4) is satisfied:

$$4.0 < L/f34 < 6.0 \quad (4),\text{ where}$$

L is a distance from the vertex of the object-side surface of the first lens to an image plane, and
f34 is a combined focal length of the third lens and the fourth lens.

5. An imaging lens, as defined in claim 1, wherein the following formula (5) is satisfied:

$$5.0 < L/f4 < 8.0 \quad (5),\text{ where}$$

L is a distance from the vertex of the object-side surface of the first lens to an image plane, and
f4 is a focal length of the fourth lens.

6. An imaging lens, as defined in claim 1, wherein the following formula (6) is satisfied:

$$0.5 < (r4+r3)/(r4-r3) < 1.0 \quad (6),\text{ where}$$

r3 is a paraxial radius of curvature of the object-side surface of the second lens.

7. An imaging lens, as defined in claim 1, wherein the Abbe number of the material of the first lens with respect to d-line is greater than or equal to 40, and wherein the Abbe number of the material of the second lens with respect to d-line is greater than or equal to 50, and wherein the Abbe number of the material of the third lens with respect to d-line is less than or equal to 40, and wherein the Abbe number of the material of the fourth lens with respect to d-line is greater than or equal to 50.

8. An imaging lens, as defined in claim 1, wherein the full angle of view of the imaging lens is greater than 200°.

9. An imaging apparatus comprising:
an imaging lens, as defined in claim 1.

* * * * *